United States Patent
Yoshida et al.

(10) Patent No.: US 8,121,077 B2
(45) Date of Patent: Feb. 21, 2012

(54) RELAY DEVICE AND RELAY METHOD

(75) Inventors: Atsushi Yoshida, Osaka (JP); Takao Yamaguchi, Osaka (JP); Tomoki Ishii, Osaka (JP)

(73) Assignee: Panasonic Corporation, Osaka (JP)

( * ) Notice: Subject to any disclaimer, the term of this patent is extended or adjusted under 35 U.S.C. 154(b) by 164 days.

(21) Appl. No.: 12/741,048

(22) PCT Filed: Jul. 23, 2009

(86) PCT No.: PCT/JP2009/003466
§ 371 (c)(1),
(2), (4) Date: May 3, 2010

(87) PCT Pub. No.: WO2010/010708
PCT Pub. Date: Jan. 28, 2010

(65) Prior Publication Data
US 2010/0238855 A1    Sep. 23, 2010

(30) Foreign Application Priority Data

Jul. 24, 2008   (JP) .................................. 2008-191499

(51) Int. Cl.
*H04W 4/00* (2009.01)
(52) U.S. Cl. ........................................................ 370/328
(58) Field of Classification Search ........................ None
See application file for complete search history.

(56) References Cited

U.S. PATENT DOCUMENTS

| | | | | |
|---|---|---|---|---|
| 5,581,548 A * | 12/1996 | Ugland et al. | ................ | 370/330 |
| 6,907,257 B1 * | 6/2005 | Mizutani et al. | ............... | 455/464 |
| 7,164,669 B2 * | 1/2007 | Li et al. | .......................... | 370/336 |
| 7,376,100 B2 * | 5/2008 | Chang | ............................ | 370/329 |
| 7,440,436 B2 * | 10/2008 | Cheng et al. | .................. | 370/338 |
| 7,551,591 B2 * | 6/2009 | Erlich et al. | .................. | 370/338 |
| 2002/0082035 A1 | 6/2002 | Aihara et al. | | |
| 2003/0123404 A1 * | 7/2003 | Kasapi et al. | ................. | 370/329 |
| 2008/0205360 A1 * | 8/2008 | Ren et al. | ....................... | 370/338 |
| 2010/0103845 A1 * | 4/2010 | Ulupinar et al. | .............. | 370/254 |

FOREIGN PATENT DOCUMENTS

| | | |
|---|---|---|
| JP | 2002-044003 | 2/2002 |
| JP | 2004-254048 | 9/2004 |
| JP | 2006-025338 | 1/2006 |

OTHER PUBLICATIONS

International Search Report issued Oct. 27, 2009 in International (PCT) Application No. PCT/JP2009/003466.

* cited by examiner

*Primary Examiner* — Chirag Shah
*Assistant Examiner* — Otis L Thompson, Jr.
(74) *Attorney, Agent, or Firm* — Wenderoth, Lind & Ponack, L.L.P.

(57) ABSTRACT

A relay device can perform high-quality communication even in a wireless mesh network where relay devices are densely arranged and interference of wireless packets is caused. The relay device includes: a representative node determining unit (605) which determines the channel used in its own cluster for intra-cluster communication to be a channel different from the channel used in neighboring cluster for intra-cluster communication, when the communication quality of its own relay device does not meet predetermined quality and no representative node exists among neighboring nodes; a joining and removal notifying unit (607) which allows a neighboring node which is not associated with any cluster to join to its own associated cluster; and a frequency channel changing unit (609) which changes the channel used for intra-cluster communication to the channel determined by the representative node determining unit (605) of the representative node.

12 Claims, 35 Drawing Sheets

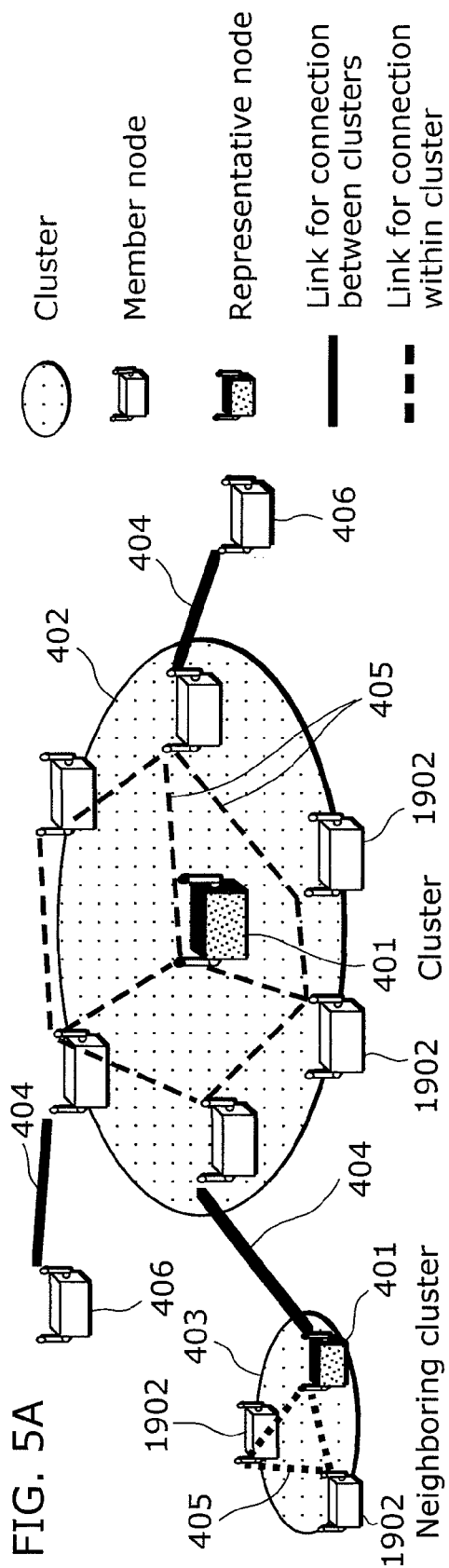

| Term | Definition |
|---|---|
| Cluster | A group of relay devices which share a common frequency channel in a range where communication can be made with each other |
| Member node | A relay device associated with a cluster |
| Representative node | A relay device which manages the joining of member node to cluster and the removal of member node from cluster |
| Inter-cluster channel | A channel used for communication between relay devices associated with different clusters |
| Intra-cluster channel | A channel used for communication between relay devices associated with a same cluster |
| Neighboring node | A relay device located in a range where direct communication is possible in a single hop |
| Neighboring cluster | A cluster that can make direct communication with other member nodes of own associated cluster in a single hop |

FIG. 10

| Source node identification information (IP address) | Neighboring node identification information (IP address) | Associated cluster identification information (Intra-cluster channel in use) | Representative node identification information |
|---|---|---|---|
| 192.168.0.1 | 192.168.0.2<br>192.168.0.3<br>192.168.0.5 | No association (Ch.1) | No |

| | Node identification information (IP address) | Neighboring node identification information (IP address) | Associated cluster identification information (Intra-cluster channel in use) | Representative node identification information |
|---|---|---|---|---|
| Own node | 192.168.0.1 | 192.168.0.2<br>192.168.0.3<br>192.168.0.5 | No association (Ch.1) | No |
| Neighboring node | 192.168.0.2 | 192.168.0.1<br>192.168.0.3 | No association (Ch.1) | No |
| | 192.168.0.3 | 192.168.0.1<br>192.168.0.2 | Ch.2 | Yes |
| | ... | ... | ... | ... |

1101

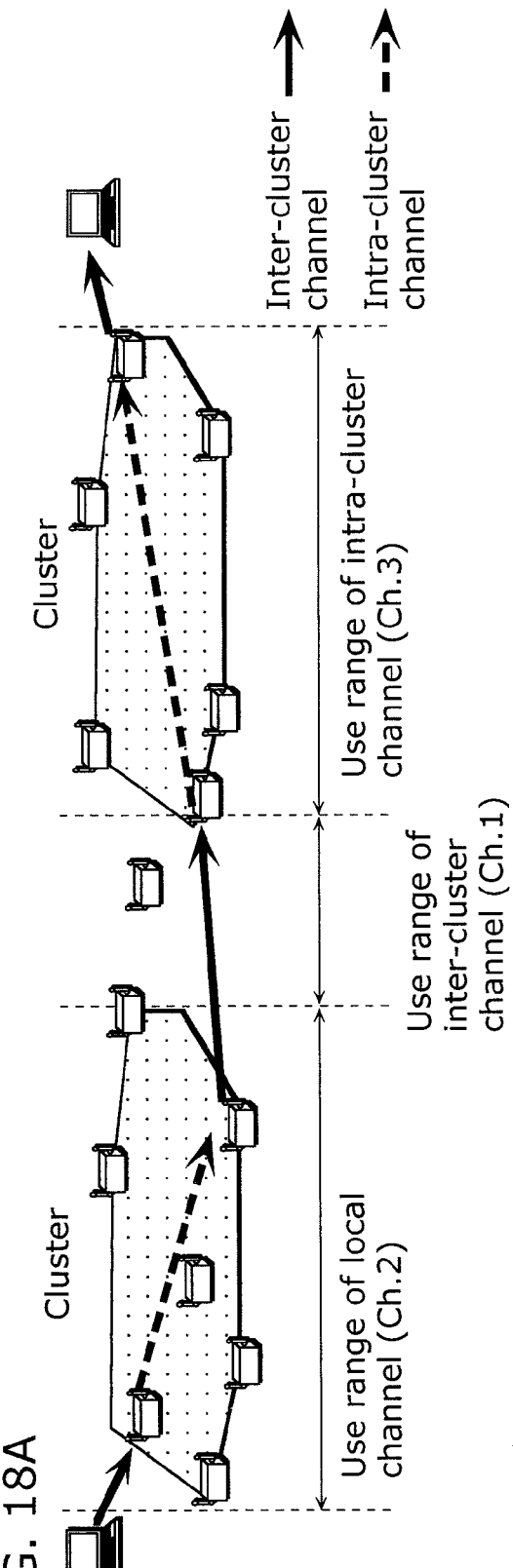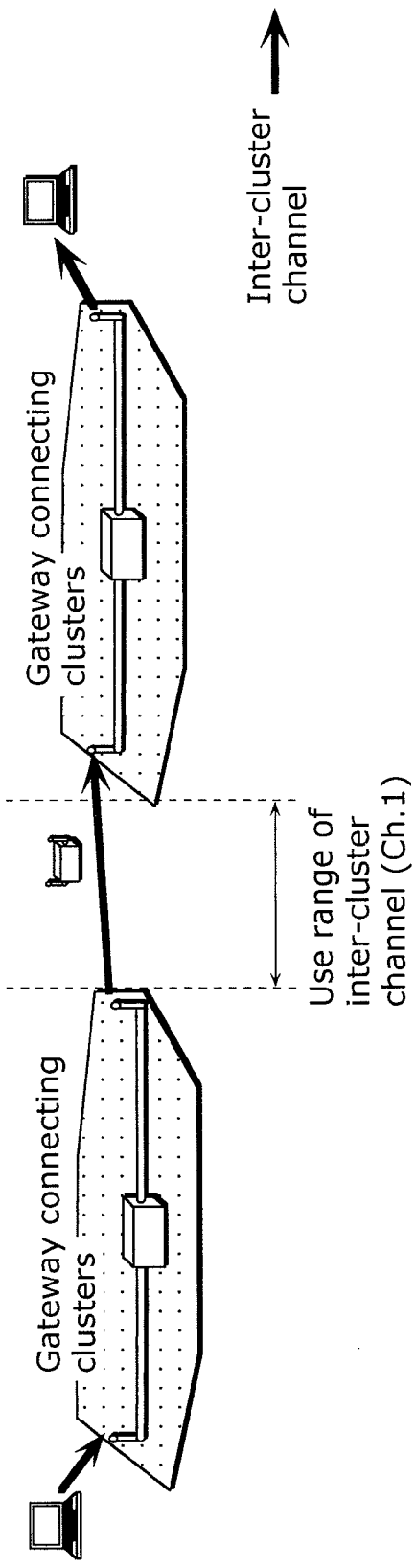

FIG. 27

| Source node identification information (IP address) | Neighboring node identification information (IP address) | Associated cluster identification information (Intra-cluster channel in use) | Location information | Representative node identification information |
|---|---|---|---|---|
| 192.168.0.1 | 192.168.0.2<br>192.168.0.3<br>192.168.0.5 | No association (Ch.1) | Latitude N34° 44' 42.963<br>Longitude E135° 45' 44.168<br>Altitude 1.23m | No |

| | Node identifier (IP address) | Neighboring node identification information (IP address) | Associated cluster identification information (Intra-cluster channel in use) | Location information | Representative node identification information |
|---|---|---|---|---|---|
| Own node | 192.168.0.1 | 192.168.0.2<br>192.168.0.3<br>192.168.0.5 | No association (Ch.1) | Latitude N34° 44′ 42.963<br>Longitude E135° 45′ 44.168<br>Altitude 1.23m | No |
| Neighboring node | 192.168.0.2 | 192.168.0.1<br>192.168.0.3 | No association (Ch.1) | Latitude N34° 44′ 42.974<br>Longitude E135° 45′ 44.152<br>Altitude 1.33m | No |
| | 192.168.0.3 | 192.168.0.1<br>192.168.0.2 | Ch.2 | Latitude N34° 44′ 42.923<br>Longitude E135° 45′ 44.171<br>Altitude 1.43m | Yes |
| | ... | ... | ... | | |

2701

RELAY DEVICE AND RELAY METHOD

TECHNICAL FIELD

The present invention relates to a relay device which performs high quality transmission in a wireless mesh network system where fixed terminals or mobile terminals are connected.

BACKGROUND ART

As a method for providing communication infrastructure in places where installation of a wired network is difficult or for securing a communication network speedily at the time of a natural disaster, attention has been directed to a wireless mesh network where wireless access points are interconnected.

FIG. 1 is a diagram showing an example of a configuration of a general wireless mesh network.

As shown in FIG. 1, in the wireless mesh network, terminals 1901 and relay devices 1902 are connected. Each terminal 1901 is a communication device, such as a mobile terminal or a personal computer, which has a function to wirelessly transmit and receive data such as video and audio data. Each relay device 1902 is a wireless access point or the like which has a function to relay, to a receiving terminal, data transmitted by a transmitting terminal.

In the wireless mesh network, communications between the terminals 1901 which cannot establish direct wireless communication with one another can be implemented by establishing communications between the terminals 1901 via one or more relay devices 1902.

However, the wireless mesh network has a problem that as the multi-hop count increases, throughput of traffic communicated between the terminals 1901 decreases.

More specifically, when a relay device 1902 relays received wireless packets to a next relay device 1902, the relayed wireless packets cause interference to neighboring relay devices 1902. This causes packet loss due to collision of wireless packets or delay due to transmission queue.

For this problem, there is a proposed conventional technique for preventing interference of wireless packets transmitted between the relay devices from occurring when two terminals (personal computers) perform communications via two or more relay devices (see Patent Literature 1).

More specifically, as shown in FIG. 2A, Patent Literature 1 discloses a technique in which relay devices 1902 that can directly communicate with one another relay wireless packets by using different frequency channels. For example, frequency channels of 1ch, 3ch, 1ch and 3ch are assigned to the respective relay devices 1902 in the order from left to right in the figure. Thus, it is possible that the frequency channel used for receiving the wireless packets and the frequency channel used for transmitting the wireless packets are different in the respective relay devices. This suppresses occurrence of interference of the wireless packets caused when the respective relay devices 1902 communicate with neighboring relay devices 1902.

[Citation List]

[Patent Literature]

[PTL 1] Japanese Unexamined Patent Application Publication No. 2006-25338

SUMMARY OF INVENTION

[Technical Problem]

However, the number of usable frequency channels is limited. Thus, in the technique disclosed in Patent Literature 1, as shown in FIG. 2B, there are too many relay devices 1902 with respect to the number of usable frequency channels in a state where the terminals 1901 and the relay devices 1902 are densely arranged. This results in a case where the same frequency channel has to be assigned to the relay devices 1902 which can directly communicate with one another. Therefore, on a path of the wireless packets, an interference of the wireless packets occurs at the point where the same frequency channels are consecutively used. As a result, communication quality is degraded. For example, on the right side of FIG. 2B, the frequency channel of 3ch is consecutively assigned to the two relay devices 1902. Further, the frequency channel of 2ch is consecutively assigned to other two relay devices 1902. Therefore, at these points, receipt of a wireless packet and transmission of another wireless packet cannot be performed in parallel, which results in degradation in communication quality.

In view of such problems, the present invention has an object to provide a relay device which can perform high-quality communication even in a wireless mesh network where relay devices are densely arranged and an interference of wireless packets is caused with one another.

[Solution to Problem]

The relay device according to an aspect of the present invention includes: a representative node determining unit which determines, when communication quality of the relay device does not meet predetermined quality and a representative node does not exist among at least one neighboring node, a channel used for intra-cluster communication in a cluster of the relay device to be a channel different from a channel used for intra-cluster communication in a neighboring cluster so that the relay device serves as the representative node, the cluster being formed of relay devices that share a common channel used for data communication, the intra-cluster communication being communication with at least another relay device in a same cluster, the at least one neighboring node being a neighboring relay device which can communicate with the relay device, the representative node being a representative relay device which determines a channel used for the intra-cluster communication; a notifying unit which notifies the at least another relay device in the cluster of the relay device about the channel determined by the representative node determining unit; a joining unit which allows a neighboring node which is not associated with any cluster among the at least one neighboring node to join the cluster of the relay device by causing the neighboring node to use, for the intra-cluster communication, the channel determined by the representative node determining unit, when the relay device is the representative node; and a channel changing unit which changes the channel used for the intra-cluster communication to the channel determined by the representative node determining unit of the representative node.

With this configuration, relay devices can form clusters each made up of the relay devices which communicate with one another using a dedicated same frequency channel. Each cluster can operate as a virtual relay device which can transmit and receive wireless packets between relay devices associated with different clusters. This suppresses occurrence of interference of wireless packets in a wireless mesh network where the relay devices are densely arranged. As a result, high-quality multi-hop communication with suppressed degradation of communication quality is possible.

It is to be noted that the present invention can be implemented not only as a relay device including such characteristic processing units, but also as a relay method including, as steps, the characteristic processing units included in the relay device. Further, the present invention can also be implemented as a program causing a computer to execute the characteristic steps included in the relay device. As a matter of course, such a program can be distributed via a storage media, such as a compact disc-read only memory (CD-ROM), and a communication network such as the Internet.

ADVANTAGEOUS EFFECTS OF INVENTION

The relay device according to the present invention suppresses degradation in communication quality caused by interference of wireless packets even in a wireless mesh network where relay devices are densely arranged. As a result, high-quality transmission can be achieved.

BRIEF DESCRIPTION OF DRAWINGS

FIG. 5A is a diagram showing an example of the wireless mesh network.

FIG. 5B is a diagram showing definitions of terms.

FIG. 10 is a diagram showing details of cluster information.

FIG. 11 is a diagram showing details of neighboring cluster information.

FIG. 18A is a diagram showing an effect obtained from formation of clusters.

FIG. 18B is a diagram showing an effect obtained from formation of clusters.

FIG. 27 is a diagram showing details of cluster information.

FIG. 28 is a diagram showing details of neighboring cluster information.

DESCRIPTION OF EMBODIMENTS

Embodiment 1

Figure 1:
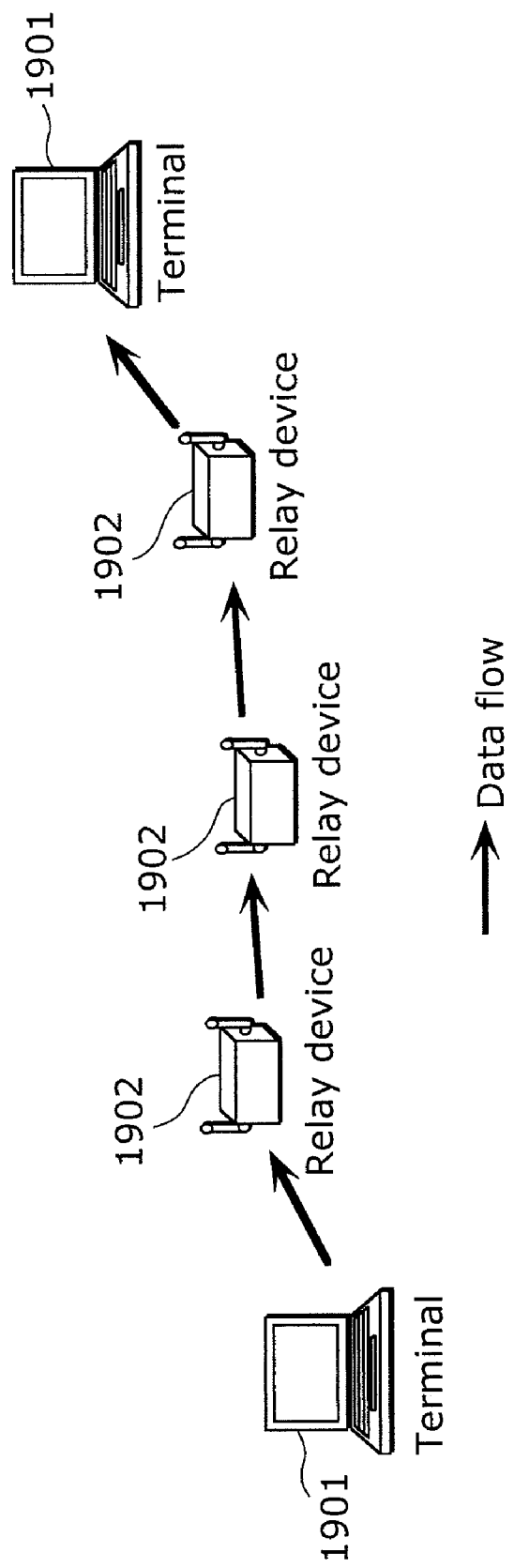
FIG. 1 is a diagram showing an example of a general wireless mesh network.
Figure 2A:
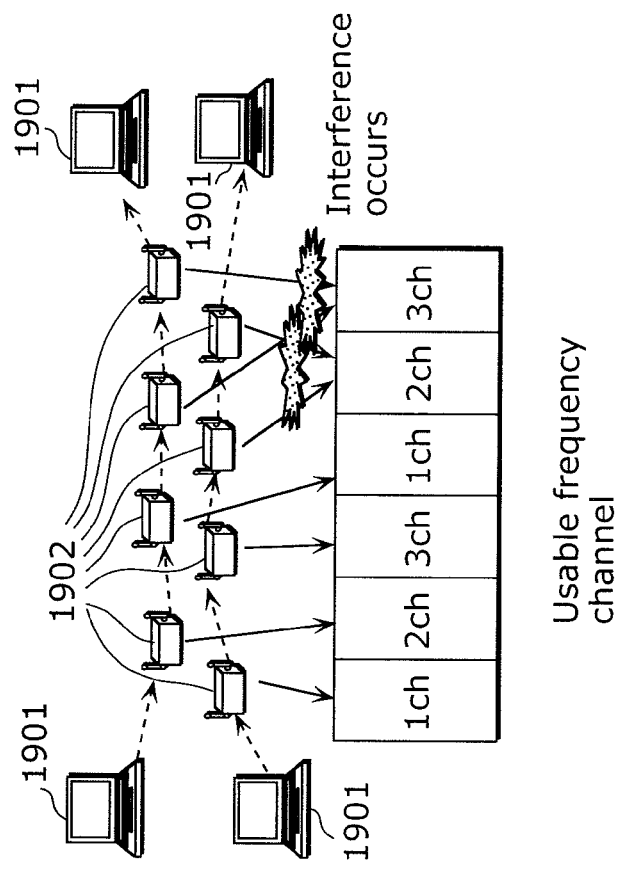
FIG. 2A is a diagram used for describing a conventional problem.
Figure 2B:
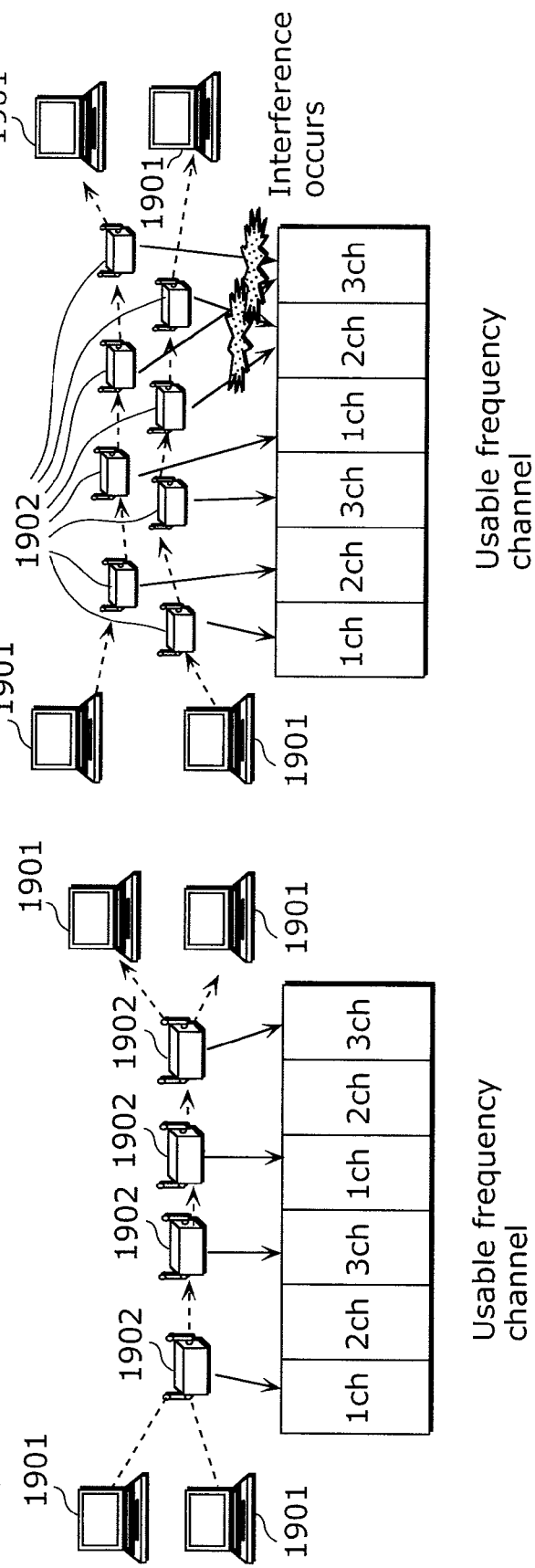
FIG. 2B is a diagram used for describing the conventional problem.
Figure 3:
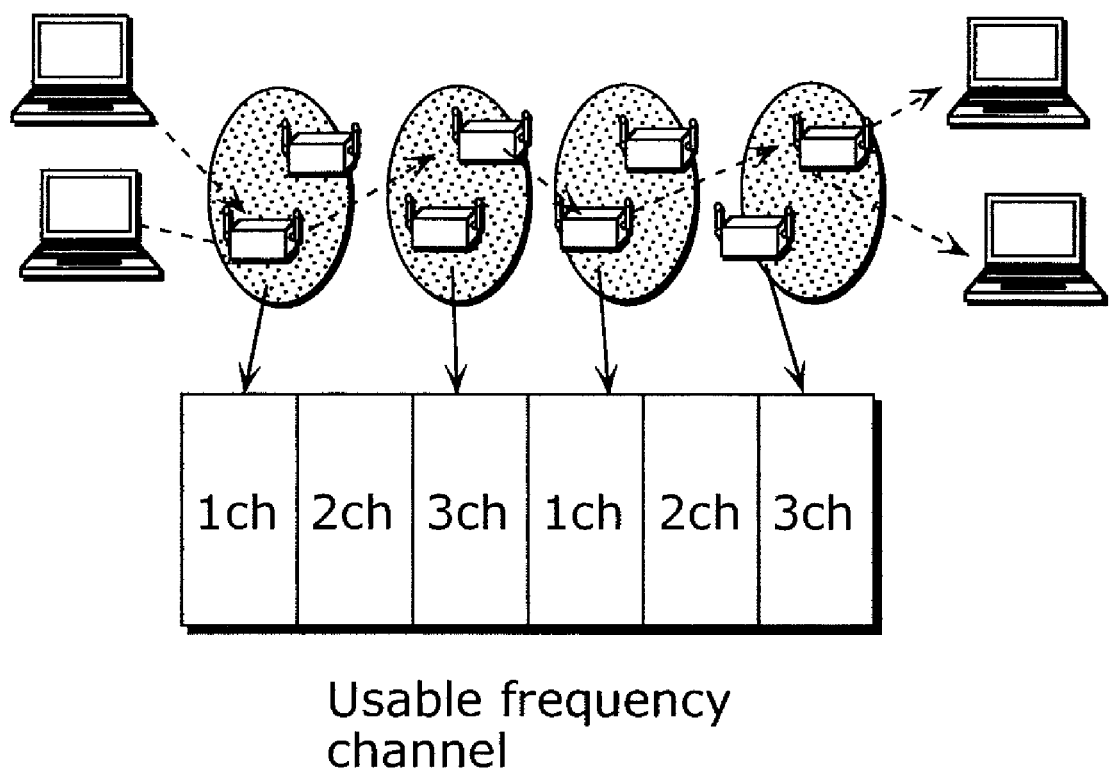
FIG. 3 is a diagram showing an approach for solving problems according to the present invention.

In the present invention, as shown in FIG. 3, clusters are formed each of which uses a common frequency channel based a range where a wireless packet communication is possible, in a wireless mesh network where relay devices are densely arranged. With this, multiple relay devices are considered as a single relay device, and wireless packets transmitted between terminals are relayed through multi-stages (multi-hop) via relay devices belonging to different clusters.

Further, interference of wireless packets is suppressed by assigning different frequency channels to neighboring clusters. This prevents wireless packets from being repeatedly relayed using a same frequency channel in a wireless mesh network where relay devices are densely arranged, thereby suppressing degradation in communication quality in the wireless mesh network.

Hereinafter, embodiments of the present invention will be described with reference to the drawings.

Figure 4:
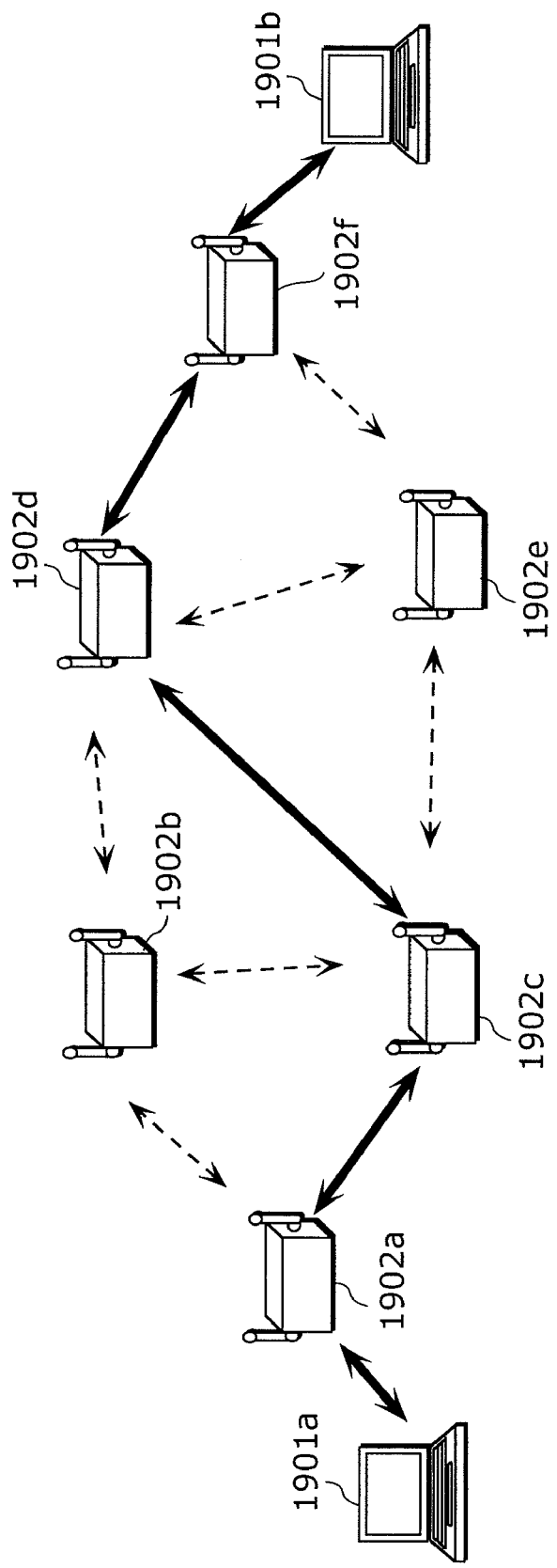
FIG. 4 is a diagram showing an example of a configuration of a wireless mesh network according to the present invention.

FIG. 4 is a diagram showing an example of a configuration of a wireless mesh network according to the present invention.

As shown in FIG. 4, a wireless mesh network is formed by terminals (terminals 1901*a* and 1901*b*) being wirelessly connected via one or more relay devices (relay devices 1902*a* to 1902*f*).

Each of the relay devices 1902a to 1902f includes communication interfaces, and is capable of simultaneously transmitting and receiving wireless packets using different frequency channels. Further, each relay device includes a routing function, and establishes interconnection between the relay devices in the wireless mesh network, and interconnection with a wired network. Here, the routing function refers to a function for selecting an optimal route for data from a transmission terminal to a receiving terminal via relay devices, and for transmitting the data through the route. The routing function may be implemented on the internet protocol (IP) packet level. Further, the routing function also may be implemented in a data link layer, as in the Institute of Electrical and Electronic Engineers (IEEE) 802.11s. For example, with the routing function, wireless packets transmitted from the terminal 1901a to the terminal 1902b are relayed in the following order: the terminal 1901a; the relay device 1902a; the relay device 1902c; the relay device 1902d; the relay device 1902e; the relay device 1902f; and the terminal 1901b. Further, the wireless packets may be transmitted from the terminal 1901a to the terminal 1901b through other paths.

In FIG. 4, the terminals 1901a and the terminal 1901b each is configured as a personal computer (PC); however, the type and performance of the terminals are not limited. Examples of the terminals include a TV having communication function used in a stationary place, a mobile phone that can be used while traveling, and a car navigation system.

Further, the type and performance of the wireless network which connects between the terminal and the relay device and between the relay devices are not limited. For example, for a wireless network, a wireless local area network (LAN), a dedicated short range communication (DSRC), or a mobile phone network may be used. Similarly, the type and performance of the wired network are also not limited. For example, for a wired network, a fiber optical network, public switched telephone networks (PSTN), or the LAN may be used.

The wireless mesh network shown in FIG. 4 is applicable to transmission of various media not just video and audio, but text, still images, music, and control data. Further, the area where the wireless mesh network can be used is also not limited. In addition, the wireless mesh network can also be applied for high-quality media transmission not just outside the house, but also inside the house.

In the present invention, the wireless mesh network is mainly described; however, networks where wired and wireless networks coexist have same problems. Therefore, the present invention can be applied not only to the wireless mesh network, but also to the networks where wired and wireless networks coexist, providing the same advantageous effects.

Next, definitions of terms used for describing the present invention including the present embodiment are explained with reference to FIG. 5A and FIG. 5B.

FIG. 5A is a diagram showing an example of the wireless mesh network. FIG. 5B is a table showing definitions of terms.

In FIG. 5A, a group consisting of the relay devices 1902 and 401 enclosed by an ellipse 402 represents a group of the relay devices 1902 and 401 that share a same frequency channel in a range where they can communicate with each other. In the present invention, such a group is defined as a "cluster".

Further, the relay devices 1902 and 401 associated with the same cluster are defined as "member nodes".

Each cluster includes at least one relay device 401 which manages the joining and the removing of the member nodes associated with the cluster and frequency channels that are used. Such a relay device 401 is defined as a "representative node".

Each of the relay devices 1902 and 401 includes two or more communication interfaces. One of the interfaces is used for communicating with relay devices 406 that are not associated with any clusters or with relay devices 1902 and 401 that are associated with a different cluster (a neighboring cluster 403 that will be described later). Further, the interface uses a frequency channel that is prepared in advance. The frequency channel is defined as an "inter-cluster channel". The communication paths used at this time are indicated by solid lines 404.

Further, in the other communication interface, a frequency channel different from the inter-cluster channel is used for communicating with the relay devices 1902 and 401 that are associated with the same cluster. This frequency channel is defined as an "intra-cluster channel". The communication paths used at this time are indicated by dashed lines 405.

Note that for the intra-cluster channel, different frequency channels are used among neighboring clusters. Thus, among the neighboring clusters, interference of wireless packets caused due to the intra-cluster channels of other clusters does not occur.

Further, in the present invention, other relay devices 1902 and 401 that exist within a range where a direct communication is possible in a single hop are defined as "neighboring nodes".

Moreover, another cluster 403 which can directly communicate with other member nodes of own associated cluster in a single hop are defined as a "neighboring cluster".

Figure 6:
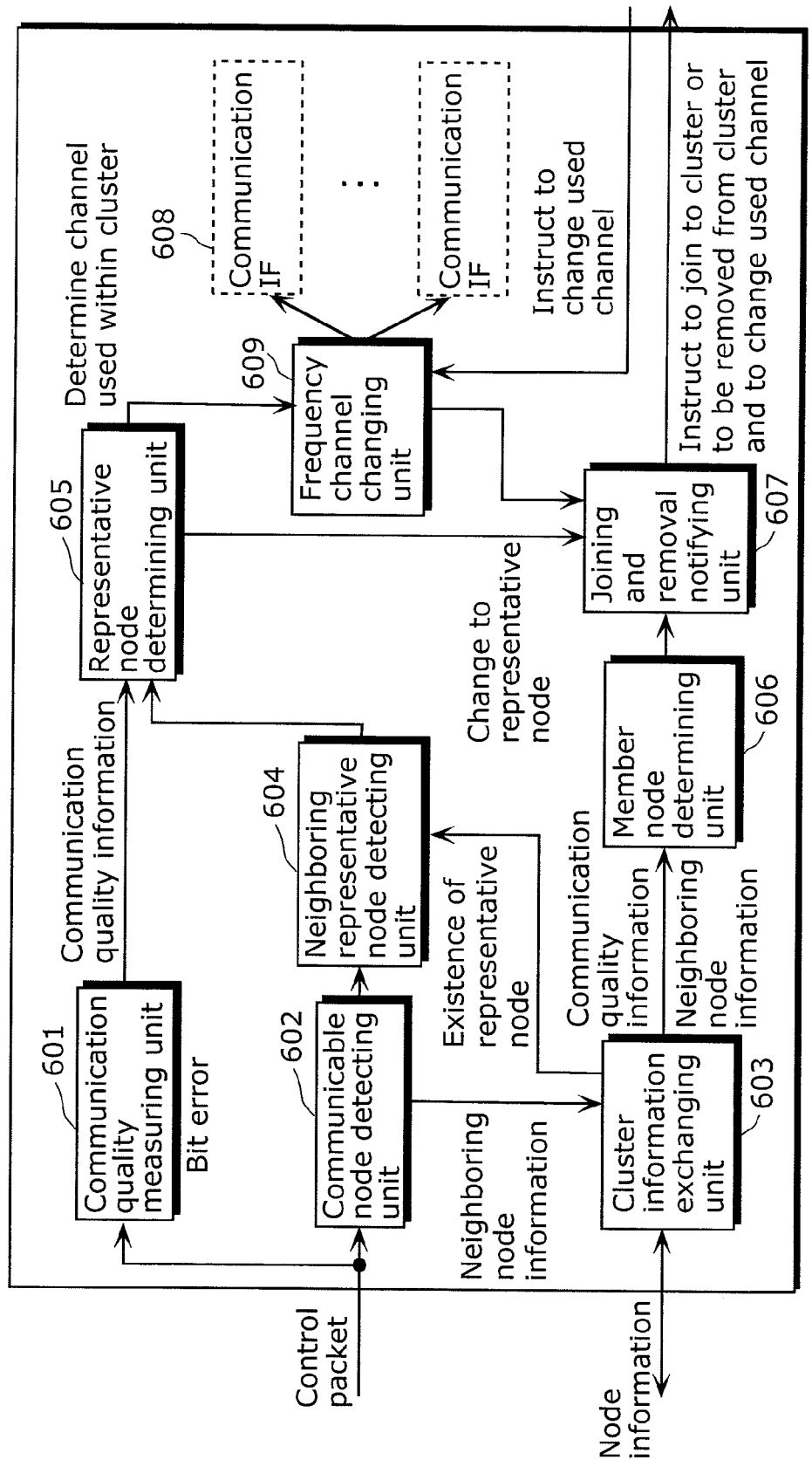
FIG. 6 is a block diagram showing a configuration of a relay device according to Embodiment 1.

FIG. 6 is a block diagram showing a configuration of the relay device according to the present embodiment.

The relay device is a device which relays data transmitted from a transmitting terminal to a receiving terminal. The relay device includes a communication quality measuring unit 601, a communicable node detecting unit 602, a cluster information exchanging unit 603, a neighboring representative node detecting unit 604, and a representative node determining unit 605. The relay device further includes a member node determining unit 606, a joining and removal notifying unit 607, communication interfaces 608, and a frequency channel changing unit 609.

The communication quality measuring unit 601 is a processing unit which measures a value of decrease in communication quality occurred due to interference of wireless packets in its own relay device. More specifically, the communication quality measuring unit 601 quantitatively measures decrease in communication quality by measuring ratio of bit errors caused in data due to the interference of wireless packets. Further, other than the bit errors, the number of re-transmissions, loss ratio of packets or the like may be used.

The communicable node detecting unit 602 is a processing unit which detects other relay devices (neighboring nodes) that can be directly communicated with in a single hop. To be more specific, the communicable node detecting unit 602 transmits and receives, to and from other relay devices, Hello packets and test packets that are used for control of link or routing. With this, the communicable node detecting unit 602 specifies relay devices which can be communicated with in a single hop, and stores information specifying the relay devices into a recording device such as a memory. For the information specifying the relay devices, media access control (MAC) addresses and IP addresses that are unique to each relay device and assigned to control packets are used.

The cluster information exchanging unit 603 is a processing unit which exchanges, with the neighboring nodes, cluster information including information on its own associated cluster and information on the neighboring nodes with which communication is being directly made. The cluster information notified by the cluster information exchanging unit 603 includes identification information for identifying neighboring nodes, identification information for identifying its own associated cluster, and information for notifying whether or not its own relay device is a representative node of the cluster. One example of a method for notifying the neighboring nodes of cluster information by the cluster information exchanging unit 603 is a notification method using dedicated wireless packets. Further, another example is a notification method in which cluster information are assigned to control packets used for control of existing link or routing.

In the case where there are other relay devices which are representative nodes of clusters among neighboring nodes with which a single-hop direct communication is possible, those relay devices are detected by the neighboring representative node detecting unit 604 which is a processing unit for detecting those relay devices. More specifically, the neighboring representative node detecting unit 604 receives, as input, information on the neighboring nodes specified by the communicable node detecting unit 602 and the cluster information obtained from the neighboring nodes by the cluster information exchanging unit 603. The neighboring representative node detecting unit 604 determines, based on these information received as input, whether any other representative nodes of clusters exist among the neighboring nodes.

The representative node determining unit 605 is a processing unit which determines whether or not to change its own relay device to a representative node so as to form a new cluster. More specifically, the representative node determining unit 605 determines, based on the detecting result of the neighboring representative node detecting unit 604, whether or not a condition that no other representative node exists within a distance where a single-hop direct communication is possible is met. Further, the representative node determining unit 605 determines, based on the measurement result of the communication quality measuring unit 601, whether or not a condition that the communication quality information of its own relay device is lower than a predetermined value is met. When the above two conditions are met, the representative node determining unit 605 changes its own relay device to a representative node, and determines an intra-cluster channel for forming a new cluster. Further, when a relay device is a representative node and there is no member node in its own cluster, there is no node which causes interference of packets with the relay device. Therefore, the representative node determining unit 605 dissolves the own cluster that its own relay device is managing, and reverts its own relay device from the representative node to an ordinary relay device. Accordingly, the representative node determining unit 605 dissolves the cluster.

Furthermore, the representative node determining unit 605 prevents a number of clusters from being densely located in the case where its own relay device is a representative node and there are other representative nodes within a range where communication is possible. To be more specific, the representative node determining unit 605 compares the number of associated member nodes or communication quality with the other representative nodes that are in a range where communication is possible, and allows one or more representative nodes to remain as a representative node. Further, the other representative nodes revert to ordinary relay devices, and dissolve the clusters that they are managing. One specific example of a method for determining representative nodes to convert to ordinary relay devices when representative nodes are densely located is a method in which representative nodes associated with clusters having less member nodes are reverted to ordinary relay devices. By the representative node dissolving the cluster in such a manner, the number of the relay devices which require a process for joining other clusters can be reduced.

Further, other than using comparison on the number of member nodes, another example is a method in which communication quality is compared between the representative nodes and the representative node having higher communication quality of the inter-cluster channel is reverted to an ordinary relay device. Accordingly, it is possible to preferentially maintain a cluster for the area having lower communication quality of the inter-cluster channel. Therefore, relay devices in a cluster perform communication with each other using a different frequency channel (intra-cluster channel) which does not cause interference with the inter-cluster channel, thereby suppressing degradation in communication quality.

The member node determining unit 606 determines, when its own relay device is a representative node, whether or not to allow a relay device which is not associated with any neighboring clusters to join its own associated cluster. Further, the member node determining unit 606 also determines whether or not to remove the member nodes associated with its own cluster from the cluster.

The joining and removal notifying unit 607 requests neighboring nodes to join its own cluster or to be removed from its own cluster, based on the determination made by the member node determining unit 606.

The communication interfaces 608 communicate with other relay devices wirelessly. Each relay device includes two or more communication interfaces 608. At least one of the communication interfaces 608 can change a frequency channel. For the communication interface 608, a wireless local area network (LAN) card which is standardized by IEEE 802.11s, Wi-Fi (registered trademark) or the like is assumed. It is to be noted that the type and performance of the communication interface 608 are not limited. For example, for the communication interface 608, Blue Tooth (registered trademark) or ZigBee (registered trademark) used for personal area network (PAN) and the like may be used. Further, the communication interface 608 may use DSRC which is used mainly for vehicle-to-vehicle communication. In addition, the communication interface 608 may be a mobile phone or the like.

The frequency channel changing unit 609 changes the frequency channel of at least one of the communication interfaces 608 in its own relay device into the frequency channel determined by the representative node determining unit 605 or the frequency channel notified by the neighboring representative node.

Figure 7:
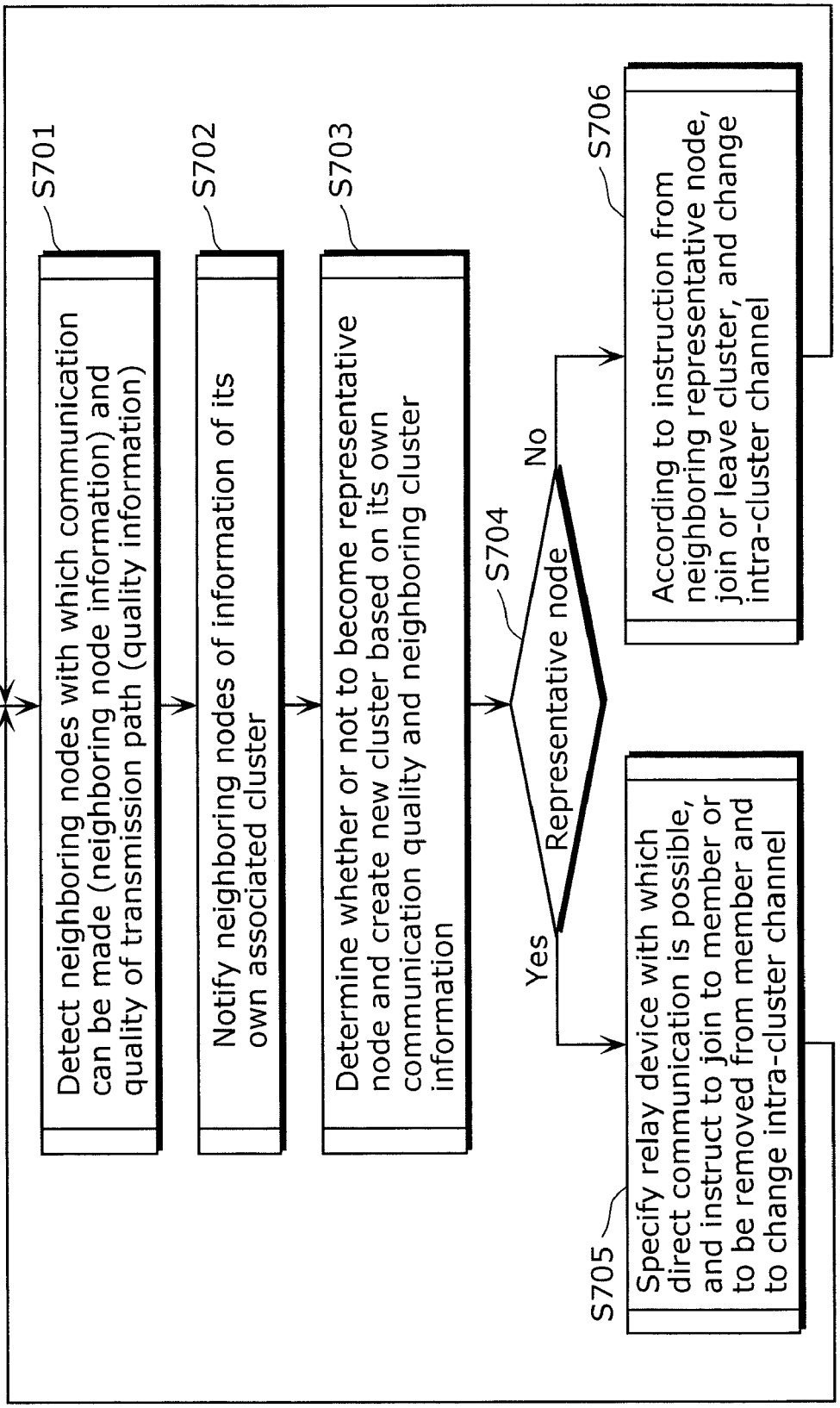
FIG. 7 is a flowchart showing operations of the relay device according to Embodiment 1.

FIG. 7 is a flowchart showing operations of the relay device according to the present embodiment.

The relay devices that are densely arranged in the present invention form clusters and assign frequency channels (intra-cluster channels) by performing the following operations so as to suppress interference of wireless packets caused in the respective relay devices.

More specifically, each relay device receives and transmits, to and from neighboring nodes, control packets using the inter-cluster channel. By doing so, each of the relay devices obtain identification information of neighboring nodes that are the relay devices with which its own relay device can directly communicate in a single hop. Then, each relay device measures communication quality between its own relay device and the neighboring nodes, and stores, into memory or the like, neighboring node information including identification information of the neighboring node and the measured communication quality with the neighboring nodes (S701). The operations for measurement of the communication quality will be described later in detail with reference to FIG. 8. Further, the details of the neighboring node information managed in each relay device will be described with reference to FIG. 9.

Next, each relay device notifies the neighboring nodes of the cluster information of its own associated cluster (S702). This process will be described later in detail with reference to FIG. 8. Further, the details of the cluster information will be described later with reference to FIG. 10 and FIG. 11.

Next, the relay device determines whether or not to become a representative node to form a new cluster based on its own communication quality and the neighboring cluster information that will be described later, and then becomes a representative node as necessary. Further, the relay device determines whether or not to revert to an ordinary relay device when the relay device is the representative node, and revert to an ordinary relay device as necessary (S703). The details of the determination method of the representative node will be described later with reference to FIG. 12. The process for reverting the representative node to an ordinary relay device will be described later with reference to FIG. 13.

When the relay device is the representative node of its own cluster (Yes in S704), the relay device specifies relay devices that can be communicated with in a single hop among the neighboring nodes. The relay device instructs the specified relay devices to join its own cluster or to be removed from the cluster and to change the intra-cluster channel (S705). The details of a method for the representative node determining the relay devices to be joined to its own cluster will be described later with reference to FIG. 14. Further, the details of a method for determining the member nodes to be removed from its own cluster will be described later with reference to FIG. 15.

When the relay device is not a representative node of the cluster (No in S704), the relay device joins to the cluster or leaves the cluster and changes the intra-cluster channel based on the instruction from the neighboring representative node (S706). This process will be described later in detail with reference to FIG. 16.

By the respective relay devices performing the above processes (S701 to S706) in a distributed autonomous way, it is possible to form clusters where a same frequency channel is used based on a range where wireless communication is possible in a wireless mesh network.

Figure 8:
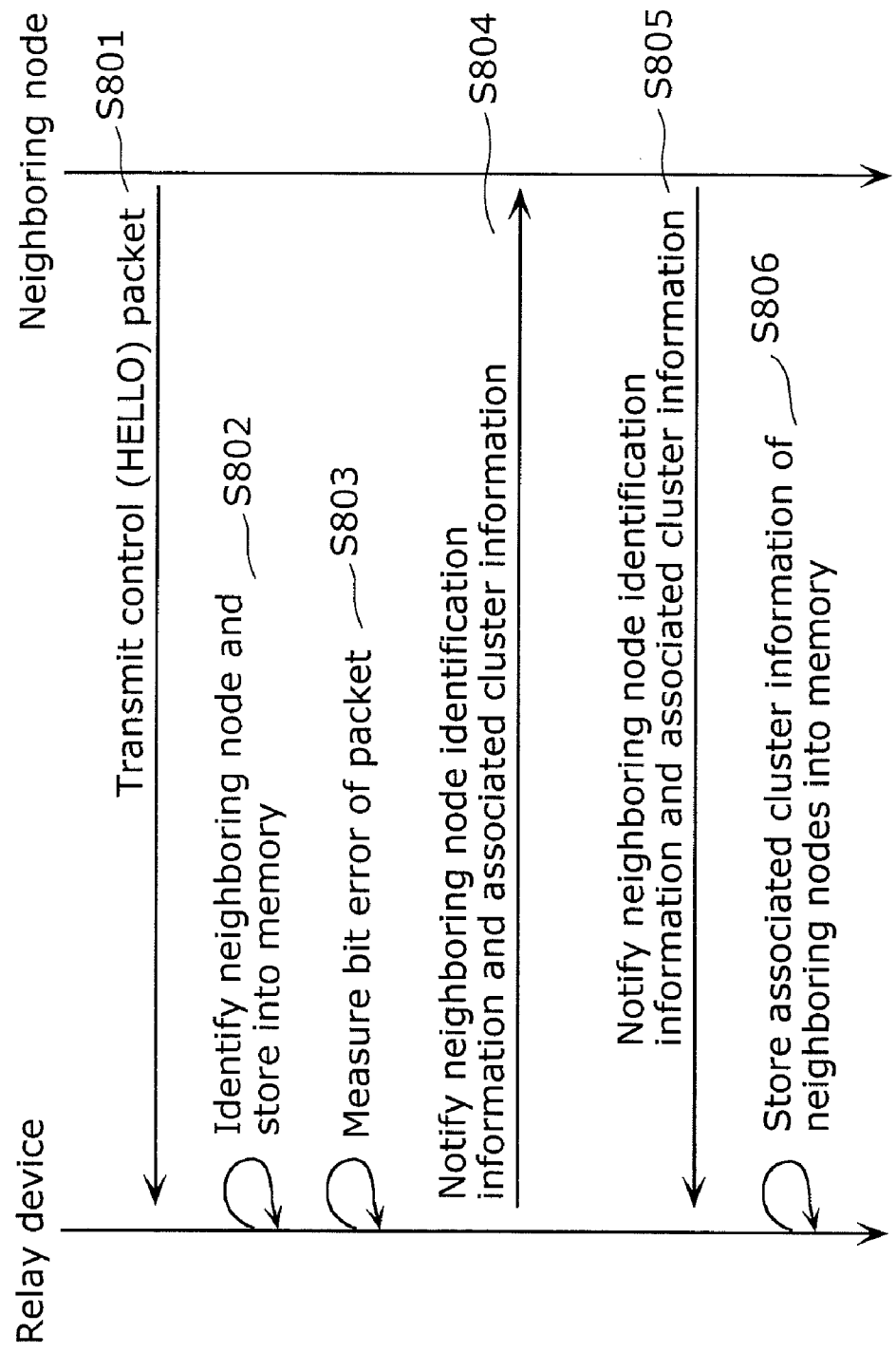
FIG. 8 is a time chart showing a process for measuring communication quality and a process for notifying cluster information.

FIG. 8 is a time chart showing a process for measuring communication quality (S701 in FIG. 7) and a process for notifying cluster information (S702 in FIG. 7). This time chart shows timings of identification of a neighboring node and measurement of communication quality that are performed in a relay device, and timing of notification of associated cluster information transmitted between the relay device and the neighboring node.

More specifically, control packets such as Hello packets are periodically transmitted to the relay devices included in the wireless mesh network for forming links with neighboring nodes and determining routing (S801). It is to be noted that the wireless packets may be other than the above wireless packets, and the type of the packets are not particularly limited as long as they are wireless packets which are transmitted periodically between the relay devices.

The communicable node detecting unit 602 identifies the neighboring node based on the MAC address or IP address described in the packet header of the control packet transmitted from the neighboring node. Further, the communicable node detecting unit 602 stores information for identifying the neighboring node into a memory or the like (S802).

The communication quality measuring unit 601 measures bit error rate of the wireless packets so as to quantitatively measure the communication quality of the wireless packets transmitted from the neighboring node. Further, the communication quality measuring unit 601 adds the measured bit error rate to the neighboring node information and stores them into a memory or the like (S803). The bit error rate refers to the values indicating the ratio of the bit values that have been altered due to interference or noise, in the data included in the wireless packets. In the environment where there is not much interference or noise, data is not altered; and thus, the bit error rate is low. On the other hand, in the environment where there are much interference or noise, its influence increases the alteration of the data, which results in increases in the bit error rate. For this reason, measurement of the bit error rate allows quantitative measurement of degradation in communication quality of the wireless packets. The communication quality measuring unit 601 may measure, other than the bit rate ratio, the number of re-transmission of packets, packet delay time, packet jitter, or packet loss rate between the relay devices which are influenced by interference and noise, and may use them as communication quality information.

Figure 9:
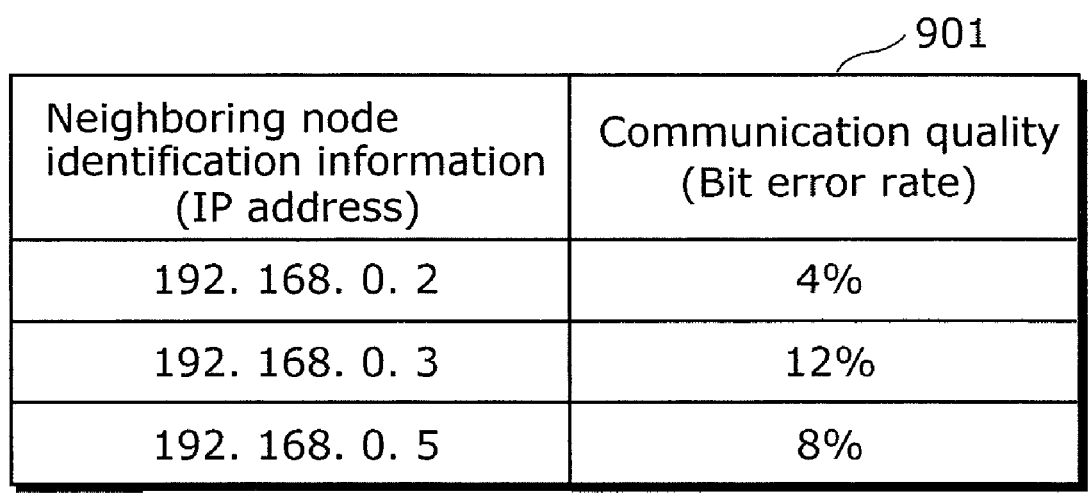
FIG. 9 is a diagram showing details of neighboring node information.

FIG. 9 shows an example of the neighboring node information stored in the memory of the relay device in S802 and S803. The neighboring node information 901 includes identification information of neighboring nodes and communication quality. The identification information of neighboring nodes includes IP addresses for identifying the neighboring nodes specified by the communicable node detecting unit 602 in S802. The communication quality includes bit error rates of the communication with the neighboring nodes that is measured by the communication quality measuring unit 601 in S802. Note that information for identifying the neighboring nodes may be, other than the IP address, a MAC address, or a terminal name as long as the information is the value uniquely assigned to each relay device. Further, for the communication quality, as described earlier, other than the bit error rate, values such as the number of re-transmission, delay time, jitter, or packet loss rate may be used.

Following the processes of S802 and S803 in FIG. 8, the cluster information exchanging unit 603 notifies the neighboring nodes of cluster information including identification information of the relay devices which exist near its own relay device and information for identifying its own associated cluster (S804). Examples of methods for notifying cluster information by the cluster information exchanging unit 603 include, as described earlier, a method in which the cluster information is added to the control signal used for forming or managing wireless mesh networks before notification. Further, another example is a method in which dedicated wireless packets are used for notification.

FIG. 10 is a diagram showing an example of the cluster information.

Cluster information 1001 is information that is notified to the neighboring nodes by the cluster information exchanging unit 603. The cluster information 1001 includes source node identification information, neighboring node identification information, associated cluster identification information, and representative node identification information. The source node identification information is information for identifying the relay device that is the source of the transmission. The neighboring node identification information is identification information on a group of neighboring nodes (a group of the relay devices with which its own relay device can communicate in a single hop). The associated cluster identification information is information for identifying a cluster with which a relay device is associated. The representative node identification information is information which indicates whether or not the relay device indicated by the source node identification information is a representative node.

The source node identification information and the neighboring node identification information are not particularly limited as long as they are information that uniquely identify respective relay devices, such as IP address.

As the associated cluster identification information, information that can discriminate each cluster among the neighboring clusters is described. For example, the value of the frequency channel that is being used as the intra-cluster channel is used as the cluster identification information. Further, in the case where a relay device is not associated with any clusters, information is described which indicates that the relay device is not associated with any clusters. For example, the value of the frequency channel that is being used as the inter-cluster channel is used as information of the relay device that is not associated with any clusters.

The representative node identification information indicates that the relay device indicated by the source node identification information is a representative node when marked as "Yes", and indicates that the relay device indicated by the source node identification information is not a representative node but an ordinary relay device when marked as "No".

Following the process of S804 in FIG. 8, each neighboring node also transmits and receives, by the cluster information exchanging unit 603, the cluster information of its own associated cluster to and from other neighboring nodes in a similar manner (S805).

The cluster information exchanging unit 603 stores the cluster information transmitted from the neighboring nodes into its own memory or the like (S806).

FIG. 11 shows an example of the neighboring cluster information including cluster information of its own relay device and the neighboring nodes that are stored in a memory or the like of each relay device.

The neighboring cluster information 1101 is information in which its own associated cluster information and cluster information of each neighboring node are distinctively stored. The neighboring cluster information 1101 includes the node identification information, the neighboring node identification information, the associated cluster identification information, and the representative node identification information.

The node identification information is information for identifying relay devices. The cluster information is identified by the node identification information. More specifically, the node identification information includes the content described in the source node identification information of the cluster information 1001 shown in FIG. 10. The details of the neighboring node identification information, the associated cluster identification information, and the representative node identification information are the same as those of corresponding information included in the cluster information 1001 shown in FIG. 10; and thus, the descriptions of them are not repeated.

Each of the relay devices performs processes from S801 to S806 while communicating with the neighboring nodes to create the neighboring node information shown in FIG. 9 and the neighboring cluster information shown in FIG. 11.

Figure 12:
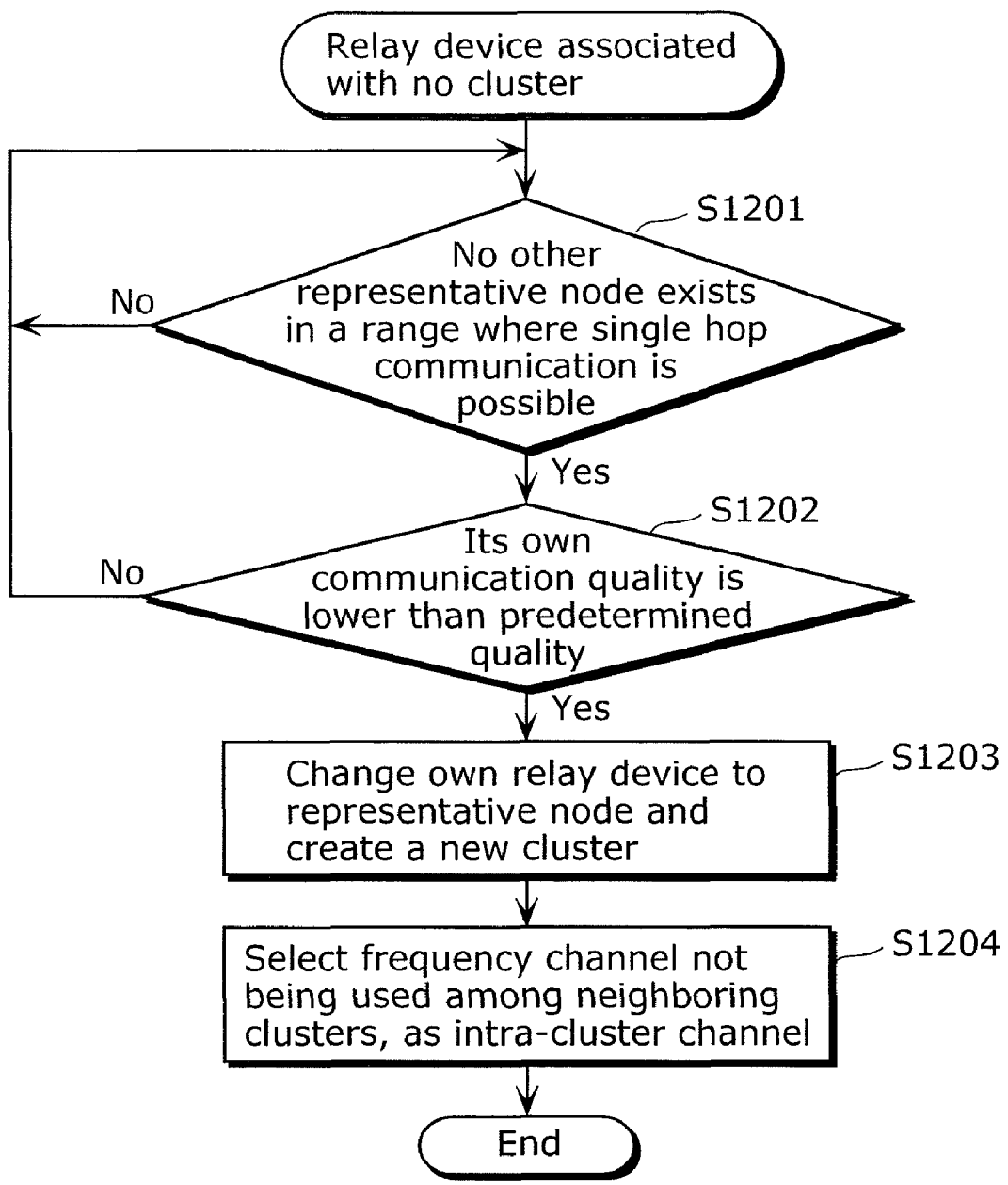
FIG. 12 is a flowchart showing a process for changing its own relay device from an ordinary relay device to a representative node.

FIG. 12 is a flowchart showing a process for changing its own relay device from an ordinary relay device to a representative node in S703 of FIG. 7. This process is performed by a relay device which is not associated with any clusters. To be more specific, the representative node determining unit 605 of the relay device which is not associated with any clusters refers to the neighboring cluster information 1101 created by the cluster information exchanging unit 603. By doing so, the representative node determining unit 605 determines whether or not any representative nodes exist within a range where a single hop communication is possible (S1201). When there are other representative nodes (No in S1201), the representative node determining unit 605 repeats the process of S1201.

When there is no other representative node (Yes in S1201), the representative node determining unit 605 refers to the neighboring node information 901 created by the communication quality measuring unit 601. By doing so, the representative node determining unit 605 determines whether or not the communication quality of its own relay device is lower than predetermined quality (S1202). For example, when there is a neighboring node having 10% or more bit error rate, the representative node determining unit 605 determines that the communication quality is lower than the predetermined quality. When the communication quality is higher than the predetermined quality (No in S1202), the process is continued at S1201.

When the communication quality is equal to or lower than the predetermined quality (Yes in S1202), the representative node determining unit 605 changes its own relay device to a representative node. Then, the representative node determining unit 605 describes the value indicating that its own relay device is a representative node in the representative node identification information of the neighboring cluster information 1101 (S1203).

Further, the representative node determining unit 605 refers to the neighboring cluster information 1101, and selects, as the associated cluster identification information, the frequency channel that is not being used by neighboring clusters. Then, the relay device uses this frequency channel as an intra-cluster channel (S1204).

In such a manner, the relay device that is not associated with any clusters forms a new cluster and assigns an intra-cluster channel for the area having a greater degradation in communication quality based on the operations from S1201 to S1204 performed by the representative node determining unit 605.

Figure 13:
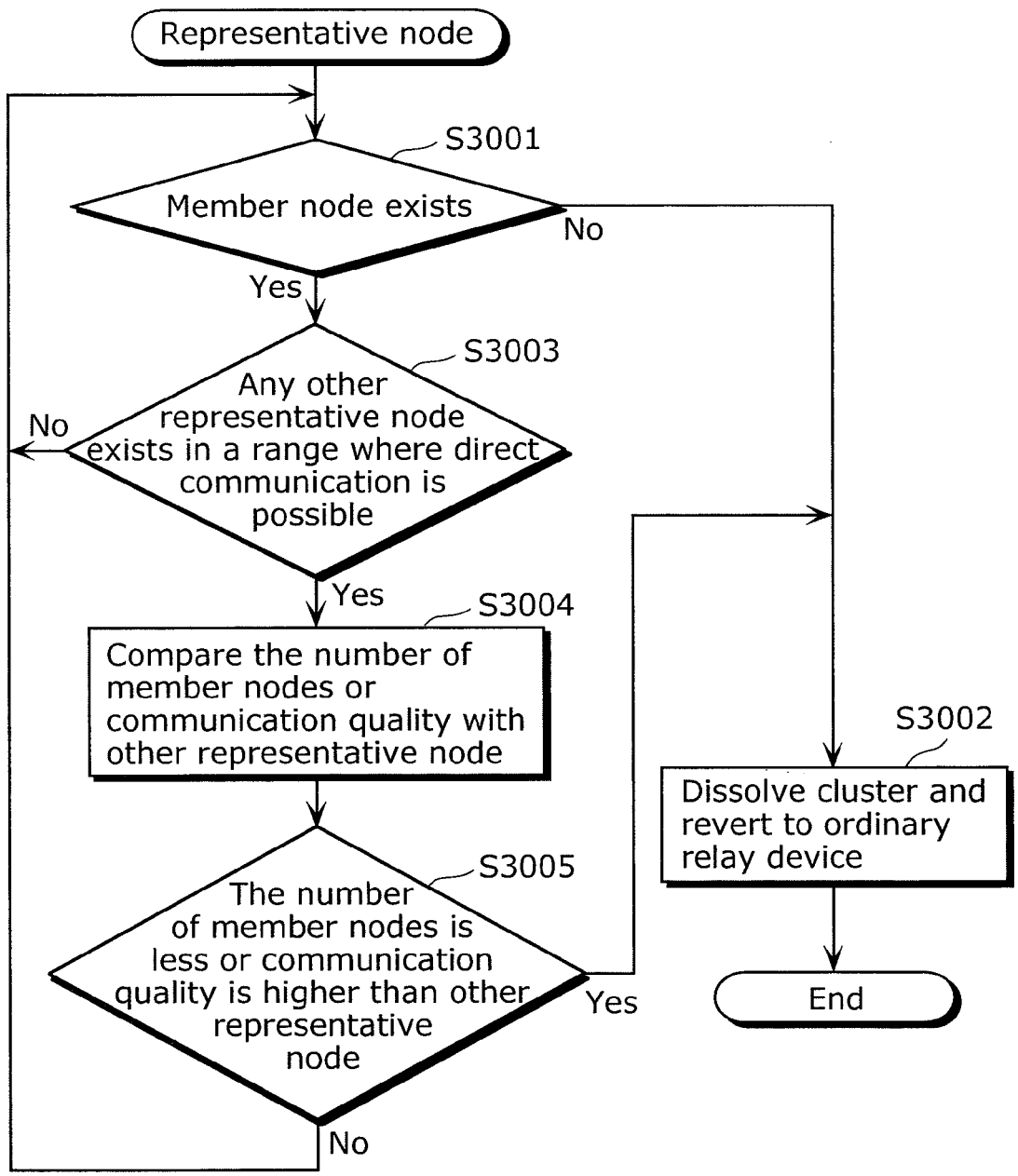
FIG. 13 is a flowchart showing a process for reverting its own delay device from a representative node to an ordinary relay device.

FIG. 13 is a flowchart showing a process for changing its own relay device from a representative node to an ordinary relay device in S703 of FIG. 7. This process is performed by a representative node.

The representative node determining unit 605 of the representative node refers to the neighboring cluster information 1101 created by the cluster information exchanging unit 603 to determine whether or not there are any member nodes (S3001). When no member node exists (No in S3001), the representative node determining unit 605 dissolves the cluster and reverts to an ordinary relay device (S3002).

When other member node exists (Yes in S3001), the representative node determining unit 605 refers to the neighboring cluster information 1101 created by the cluster information exchanging unit 603. With this, the representative node determining unit 605 determines whether or not any other representative nodes exist in a range where a single-hop communication is possible (S3003). When there is no other representative node (No in S3003), the process continues at S3001.

When there are any other representative nodes (Yes in S3003), the representative node determining unit 605 refers to the neighboring node information 901 created by the communication quality measuring unit 601. With this, the representative node determining unit 605 compares the number of member nodes and the values of the communication quality with other representative nodes (S3004).

When the number of the member nodes in its own associated cluster is less than that of the clusters of the other representative nodes, or when its own communication quality is higher (Yes in S3005), the representative node determining unit 605 dissolves its own associated cluster, and reverts to an ordinary relay device (S3002). When the number of the member nodes in its own associated cluster is equal to or greater than that of the other representative nodes and when the communication quality is equal to or lower (No in S3005), the process continues at S3001.

In such a manner, the processes from S3001 to S3005 are performed by the representative node determining unit 605. With this, the representative node determines whether to dissolve its own cluster and revert to an ordinary relay device, in the case where there is no other member node or other representative node exists in the range where direct communication is possible.

Figure 14:
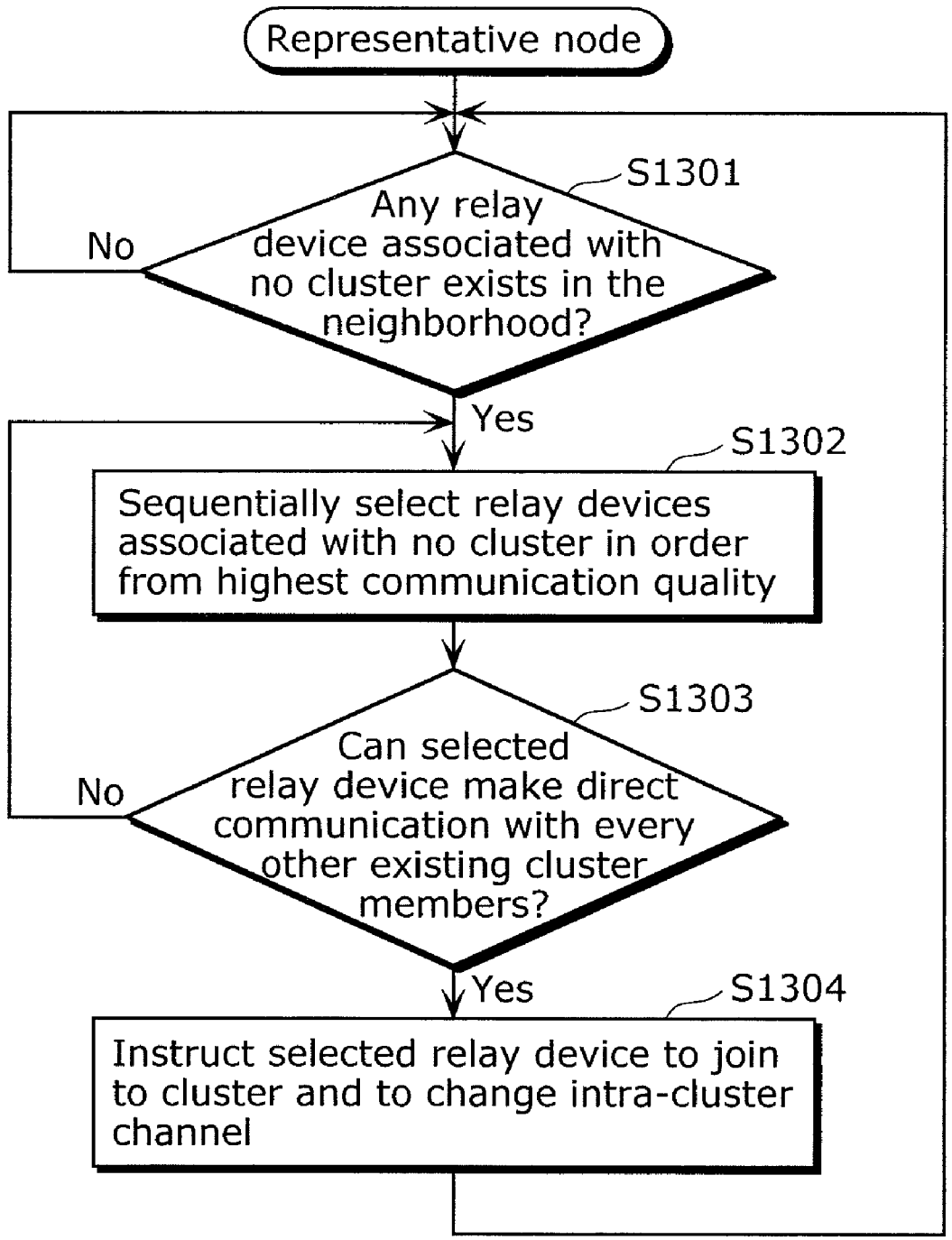
FIG. 14 is a flowchart showing a process for adding a new member node into a cluster.

FIG. 14 is a flowchart showing a process for adding a new member node to a cluster in S705 of FIG. 7.

In each of the clusters formed according to the present invention, each relay device can always communicate with every other relay device in the same cluster in a single hop. Thus, each of the representative nodes specifies relay devices that can communicate with one another, and performs the following processes to allow the specified relay devices to join its own cluster. The following processes are performed by the representative node.

First, the member node determining unit 606 of the relay device that has become a representative node refers to the neighboring cluster information 1101 created by the cluster information exchanging unit 603. With this, the member node determining unit 606 determines whether or not there are any relay devices which are not associated with any clusters among the neighboring nodes (S1301). When there is no adjacent relay device which is not associated with any clusters (No in S1301), the member node determining unit 606 repeats the process of S1301.

When there are relay devices which are not associated with any clusters exist in the neighborhood (Yes in S1301), the member node determining unit 606 further refers to the neighboring cluster information 1101 and the neighboring node information 901 created by the communication quality measuring unit 601. With this, the member node determining unit 606 sequentially selects the relay devices which are not associated with any clusters in order from the highest communication quality (S1302).

Here, the reason that the relay device with the highest communication quality is specified is for preferentially allowing the relay device which is closer in distance to the representative node to join the cluster. By checking the level of decrease in communication quality, it is possible to indirectly specify the relay device which is close in distance to the representative node. This utilizes the characteristics that the farther a relay device is located from a representative node, the more easily the relay device is affected by interference or noise of other relay devices and the more easily the communication quality is degraded.

Next, the member node determining unit 606 refers to the neighboring cluster information 1101, and determines whether or not the relay device selected in S1302 can directly communicate with every relay device in its own associated cluster (S1303). When the selected relay device cannot directly communicate with every relay device in its own associated cluster (No in S1303), the member node determining unit 606 selects a relay device with the second highest communication quality (S1302).

When the selected relay device can directly communicate with every relay device in its own associated cluster (Yes in S1303), the joining and removal notifying unit 607 instructs the selected relay device to join the cluster and to change the frequency channel (S1304).

By performing the processes from S1301 to S1304 as described above, the representative node can allow the relay devices that can make direct communication in a single hop with every node in its own cluster to join its own cluster.

Figure 15:
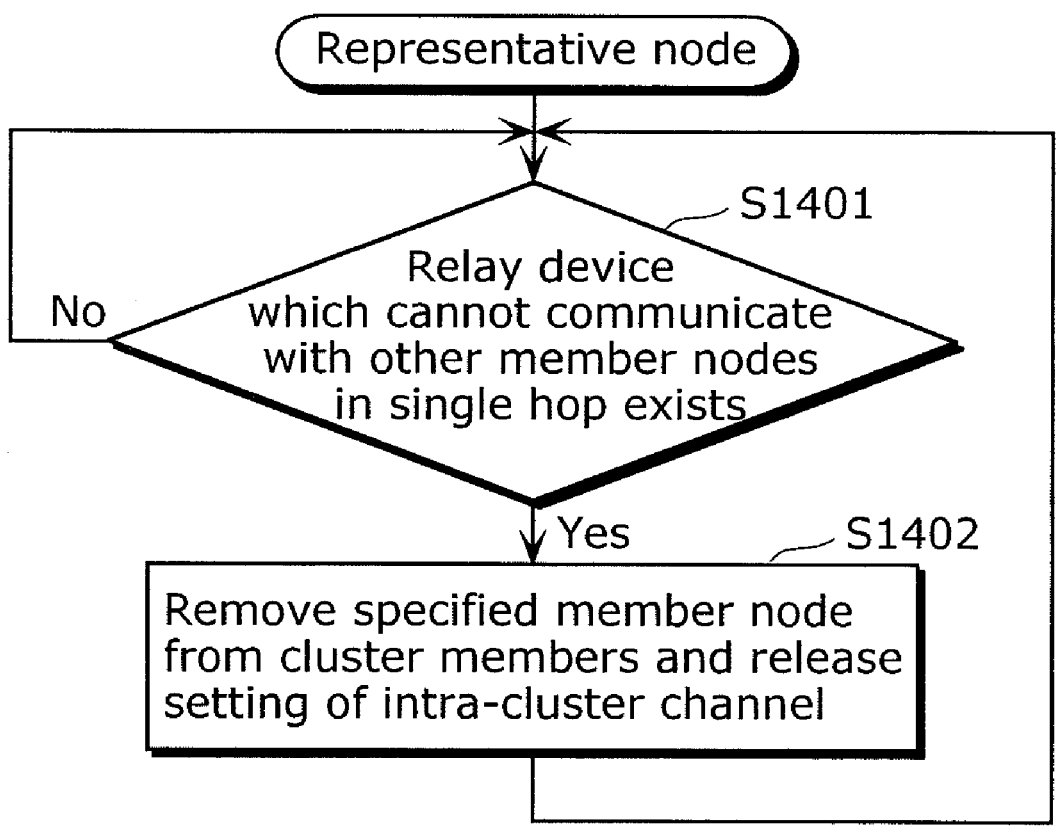
FIG. 15 is a flowchart showing a process for removing a member node belonging to the cluster.

FIG. 15 is a flowchart showing a process for removing a member node associated with its own cluster in S705 of FIG. 7. The following process is performed by a representative node.

The member node determining unit 606 of the representative node also refers to the neighboring cluster information for the already existing member nodes. With this, the member node determining unit 606 specifies a relay device which is not able to communicate with every other member nodes in a single hop due to the relocation of the relay device, changes in the surrounding transmission because of obstacles or the like (S1401). Note that the relay device with which cannot be communicated any more is a relay device which does not meet the predetermined communication quality notified by the neighboring node information 901.

When the relay device which is not able to communicate with every other member nodes in a single hop any more is specified (Yes in S1401), the joining and removal notifying unit 607 of the representative node notifies the specified relay device of the removal from the cluster. In addition, the joining and removal notifying unit 607 notifies release of the intra-cluster channel (S1402).

By performing the processes from S1401 to S1402 as described above, the representative node can remove, from its own cluster, the relay device which cannot directly communicate with other member nodes in a single hop any more.

Figure 16:
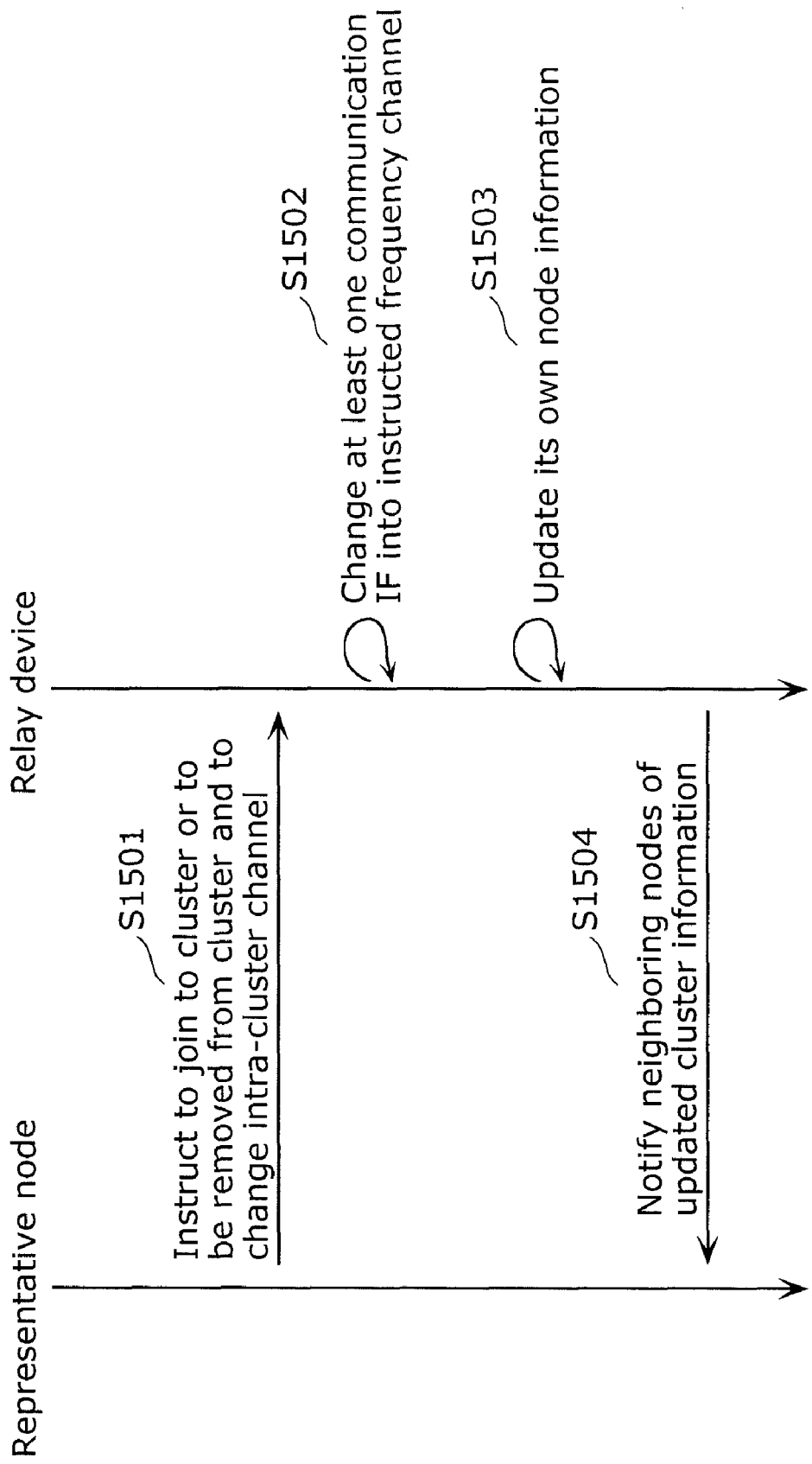
FIG. 16 is a time chart for showing a process for joining to the cluster and removing from the cluster (S706 in FIG. 7).

FIG. 16 is a time chart for showing a process for joining to the cluster and being removed from the cluster (S706 in FIG. 7). This time chart shows timings for joining to the cluster and being removed from the cluster.

A neighboring representative node instructs a relay device to join to the cluster or to be removed from the cluster, and to change the intra-cluster channel (S1501). The frequency channel changing unit 609 of the relay device changes at least one of the communication interfaces to the instructed intra-cluster channel upon receipt of instruction to join the cluster. Further, upon receipt of instruction to be removed from the cluster, the frequency channel changing unit 609 of the relay device reverts the frequency channel of the communication interface 608 that is using the intra-cluster channel to the inter-cluster channel (S1502). By doing so, interference of wireless packets caused due to the inter-cluster channel is prevented from occurring between the relay device being removed and the cluster from which the relay device is removed.

When newly joining to the cluster, the cluster information exchanging unit 603 of the relay device changes the content of its own associated cluster identification information in the neighboring cluster information 1101 into identification information of the newly associated cluster. When being removed from the cluster, the cluster information exchanging unit 603 changes the content of its own associated cluster identification information in the neighboring cluster information 1101 (S1503).

Further, the cluster information exchanging unit 603 of the relay device notifies the representative node and other neighboring nodes of the updated cluster information 1001 of its own.

In such a manner, the operations from S1501 to S1504 are performed. With this, the relay device which is instructed to join the cluster or to be removed from the cluster by the representative node changes the frequency channel of the communication interface 608 and the cluster information 1001 of its own.

Figure 17:
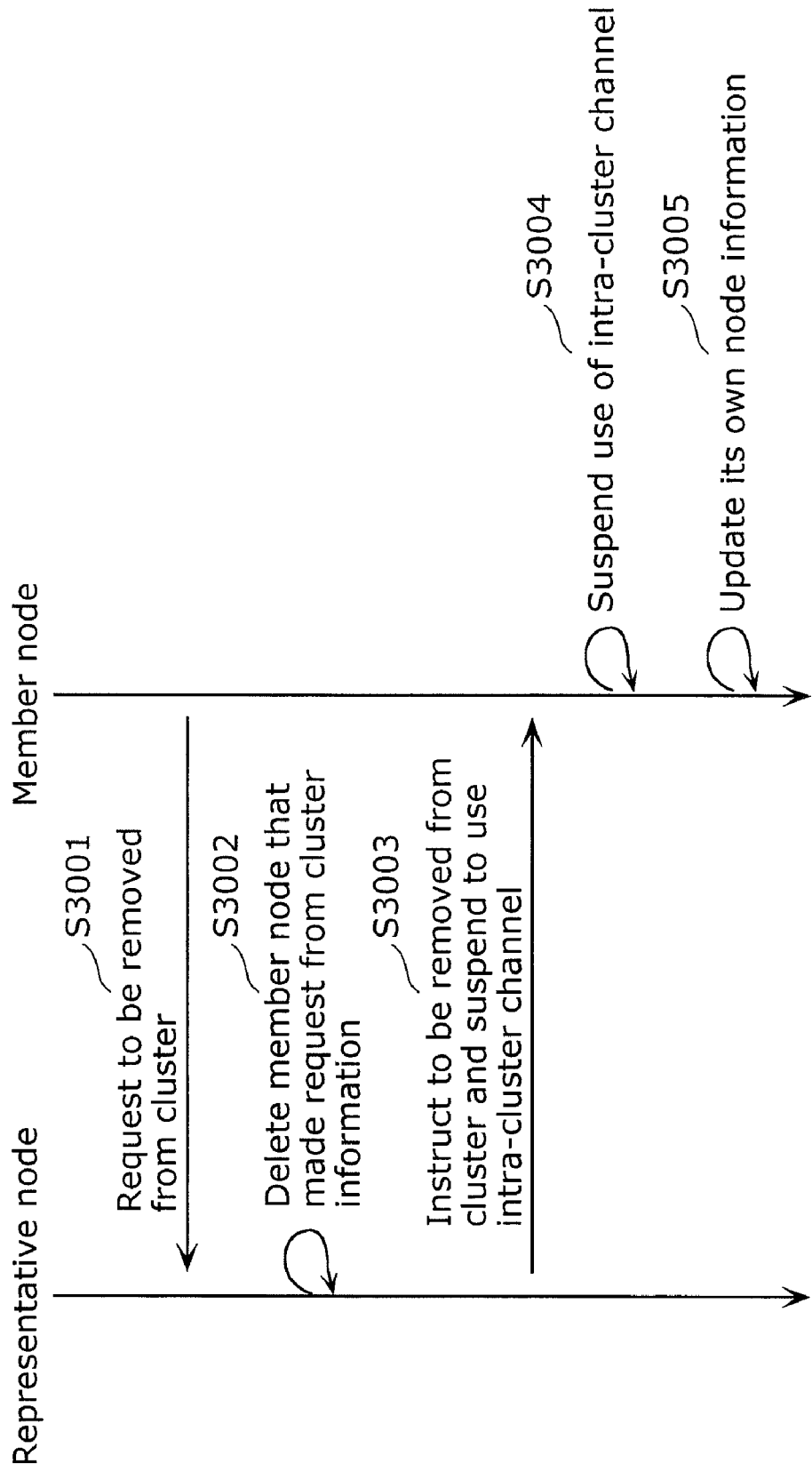
FIG. 17 is a time chart showing a process for removing, from the cluster, a member node that requested to be removed from the cluster.

FIG. 17 is a time chart showing a process for removing, from the cluster, a member node which made a request for being removed from the cluster.

Examples of cases where a request of removal from the cluster needs to be made by the member node include the case where communication is made between arbitrary relay devices using a unique frequency channel which does not cause interference with other frequency channels. In order that such changes of the frequency channel are made between only some member nodes, those member nodes need to notify the representative node that they voluntarily leave the cluster.

Further, when a member node knows in advance that it will be removed from the cluster due to the relocation, the member node requests the representative node to remove the member node from the cluster. This facilitates the change of the frequency channel.

Hereinafter, the operation for removing, from the cluster, the member node that made a request for removal from the cluster is described.

A member node transmits, to the representative node, a request to remove the member node from the cluster (S3001). In response to this request, the cluster information exchanging unit 603 of the representative node removes the member node that made the request from cluster information (S3002). The representative node transmits, to the member node which made the request, a notification about the removal of the member node from the cluster and the suspension of use of the intra-cluster channel (S3003).

Upon receipt of the notification from the representative node, the frequency channel changing unit 609 of the member node causes the communication interface that is using the intra-cluster channel to suspend usage of the intra-cluster channel (S3004).

Further, the cluster information exchanging unit 603 of the member node changes the content of the associated cluster identification information of its own relay device in the neighboring cluster information 1101 to indicate that its own relay device is not associated with any clusters (S3005).

By performing the processes from S3001 to S3005, the representative node removes, from the cluster, the member node that made the request to be removed.

With the configuration and operations described above, relay devices can form clusters each consisting of relay devices which communicates with each other sharing a dedicated common frequency channel. Each cluster operates as a virtual relay device that can transmit and receive wireless packets to and from other relay devices located in distance. As a result, degradation in communication quality caused due to interference of wireless packets in wireless mesh networks where relay device are densely arranged can be suppressed, allowing high-quality multi-hop communications.

FIG. 18A and FIG. 18B are diagrams showing effects obtained from formation of clusters and assignment of a common frequency channel to each relay device in a same cluster.

In the present embodiment, each relay device includes the configuration shown in FIG. 6 and executes the processes shown in FIG. 7. With this, in a wireless mesh network where relay devices are densely arranged, a group of the relay devices that are in a positional relationship where communication can be made with each other is considered as a single cluster. Further, a same dedicated frequency channel is assigned to each relay device in a same cluster. This prevents interference of wireless packets. Further, the frequency channel assigned to each relay device in the same cluster is a frequency channel which does not cause interference of wireless packets with relay devices in neighboring clusters.

From this, as shown in FIG. 18A, the relay devices which are associated with the same cluster can communicate with each other in a single hop using the intra-cluster channel. In this case, the wireless mesh network in FIG. 18A can be considered as the wireless mesh network shown in FIG. 18B. More specifically, each cluster can be considered as a single gateway that is connected between the neighboring clusters (or relay devices that are not associated with any clusters or terminals).

The gateways shown in FIG. 18B allow the transmitting and the receiving of the wireless packets between the relay devices and the terminals that are located distant from each other. This suppresses interference in relaying (transmission and reception of) the wireless packets. Further, when the distance between the transmitting position and the receiving position of the wireless packets is longer than reachable distance of the intra-cluster channel, interference of wireless packets due to the intra-cluster channel can be prevented.

In S705 of FIG. 7, the representative node forms a cluster in which relay devices in the same cluster can be communicated with each other in a single hop using the intra-cluster channel. This is for allowing a group of the relay devices associated with the same cluster to operate as a gateway connecting the neighboring clusters (or relay devices that are not associated with any clusters or terminals).

Further, it is desirable to set the reachable distance of the wireless packets in the following manner so as to prevent interference from occurring between the wireless packets transmitted to the cluster and the wireless packets transmitted from the cluster. More specifically, it is desirable to set the reachable distance of the wireless packets such that the reachable distance of the wireless packets transmitted using the intra-cluster channel is longer than the reachable distance of the wireless packets transmitted using the inter-cluster channel. Examples of methods of setting the reachable distance of the wireless packets include a method using the adjustment of output power of a wireless network interface, the change of the frequency range used, or the change of the type or setting of modulation and demodulation of data.

Further, in the relay device according to the present invention, before data communication between the relay devices starts, location of the cluster and assignment of the frequency channel to be used are determined in advance. For this reason, when starting data communication between terminals, it is not necessary to search for assignment of the frequency channel which does not cause interference with relay devices located on the path of the data communication and to set the frequency channel based on the search result. Therefore, time period before the data communication starts can be reduced.

Especially in the environment where a large number of relay devices are densely arranged, the number of combination of assignment of the frequency channels for the relay devices increases. This is likely to result in longer time period necessary for searching for the assignment of the suitable frequency channel. Hence, assigning the frequency channel in advance significantly reduces the time period before the data communication starts.

Embodiment 2

Next, Embodiment 2 of the present invention is described. In Embodiment 2, by controlling the communication distance of wireless packets in addition to changing the frequency channel, interference of wireless packets caused between cluster members in the same cluster can be suppressed.

Figure 19:
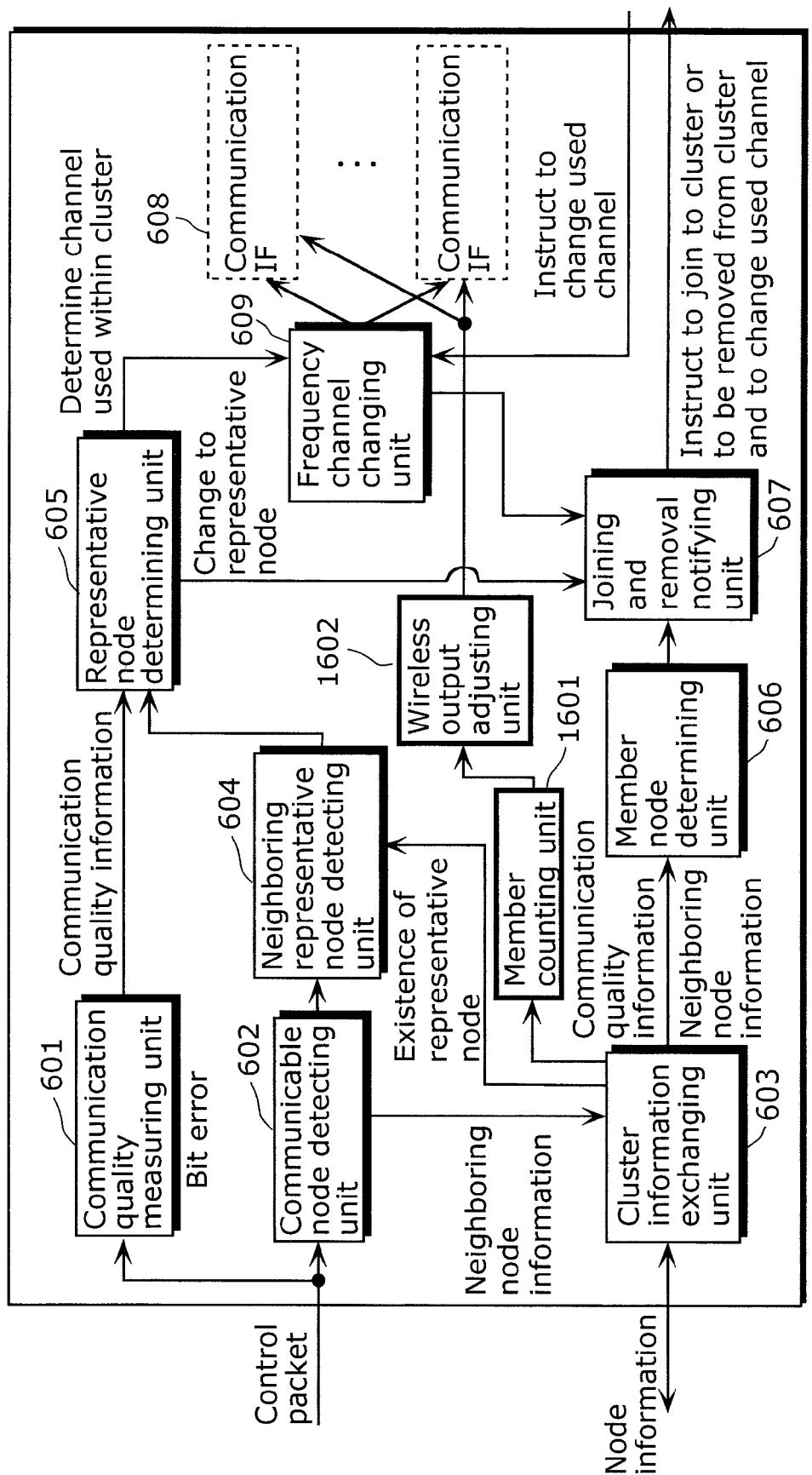
FIG. 19 is a diagram showing a configuration of a relay device according to Embodiment 2.

FIG. 19 is a block diagram showing a configuration of a relay device according to Embodiment 2. The relay device according to the present embodiment has a member counting unit 1601 and a wireless output adjusting unit 1602 in addition to the configuration of the relay device according to Embodiment 1 shown in FIG. 6. Note that the same elements as those included in the relay device in Embodiment 1 shown in FIG. 6 are assigned with the same referential number as in FIG. 6, and the descriptions thereof are not repeated.

The member counting unit 1601 refers to the neighboring cluster information 1101 obtained by the cluster information exchanging unit 603 to identify the number of the member nodes that are associated with the same cluster.

The wireless output adjusting unit 1602 controls the communication distance of the wireless packets by adjusting wireless output based on the member counting unit 1601 such that the number of member nodes in the same cluster is less than predetermined number.

The relay device according to Embodiment 2 executes the processes identical to the processes that the relay device according to Embodiment 1 executes. However, the relay device in Embodiment 2 additionally executes the process shown in FIG. 20.

Figure 20:
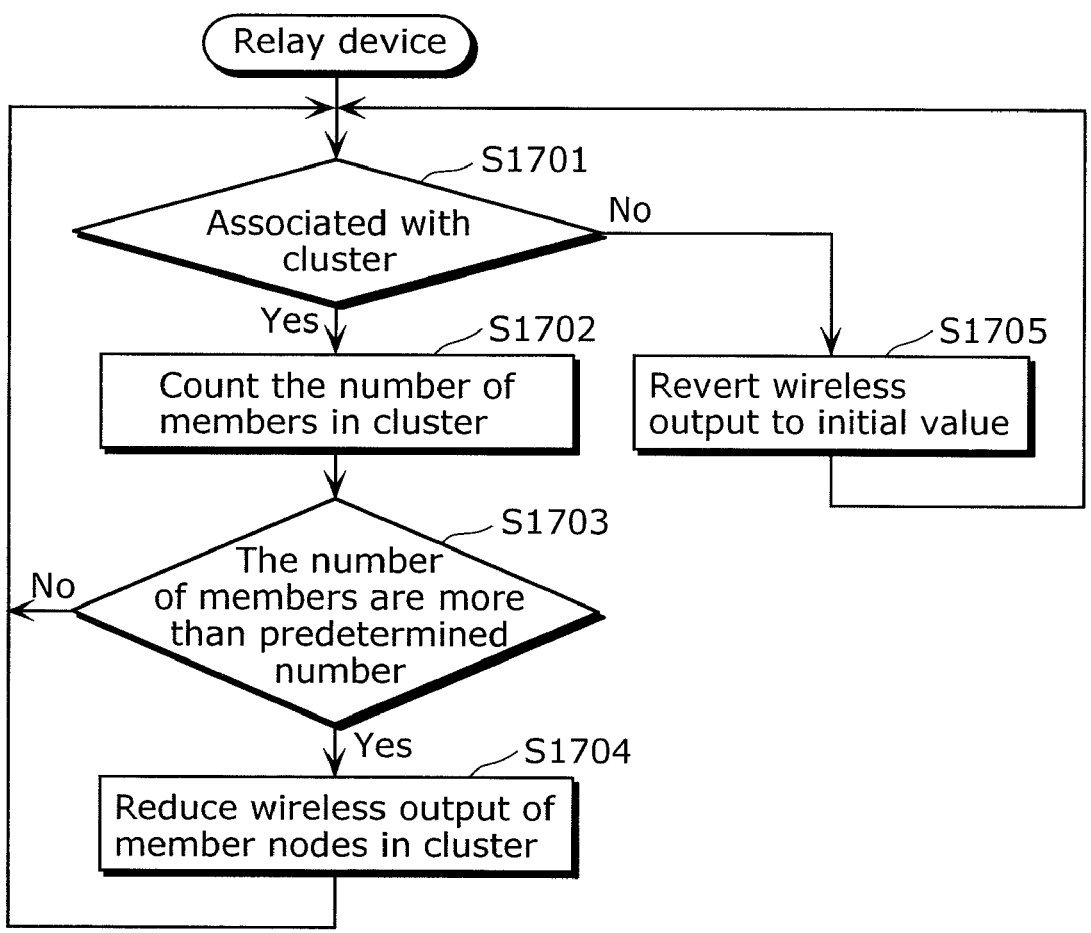
FIG. 20 is a flowchart showing operations of the relay device according to Embodiment 2.

FIG. 20 is a flowchart describing operations of the relay device according to Embodiment 2.

The member counting unit 1601 of each relay device refers to the neighboring cluster information 1101 obtained by the cluster information exchanging unit 603 to determine whether or not its own relay device is associated with a cluster (S1701).

When the relay device is associated with the cluster (Yes in S1701), the member counting unit 1601 counts the number of the member nodes in the same cluster (S1702).

The wireless output adjusting unit 1602 determines whether or not the counted number of the member nodes is greater than predetermined threshold (for example, ten member nodes) (S1703). When the counted number of the member nodes is equal to or less than the predetermined threshold (No in S1703), the process continues at S1701.

When the counted number of the member nodes is greater than the predetermined threshold (Yes in S1703), the wireless output adjusting unit 1602 lowers the value of the wireless output of the communication interface 608 (S1704).

Further, when the relay device is not associated with any clusters (No in S1701), the wireless output adjusting unit 1602 initializes the wireless output of the communication interface 608 (S1705).

From the operations from S1701 to S1705 above, it is possible to adjust the size of the cluster such that the number of the member nodes associated with the cluster is lower than the predetermined threshold. This suppresses increase in interference caused between the relay devices in the same cluster.

Embodiment 3

Next, Embodiment 3 of the present invention is described.

Since communication is made wirelessly between the relay devices in the wireless mesh network, communication quality between the relay devices significantly varies depending on the change of time or place, compared to the wired network. One reason for this is that condition of radio wave shields or the position of reflective objects is changed due to, for example, the opening and closing of windows or doors. Further, another reason is that electromagnetic waves coming from surrounding lighting or home appliances such as a microwave causes interference.

Therefore, in the condition where the communication quality varies, the range in which the respective relay devices can communicate directly to other relay devices also varies. As a result, the size of the cluster changes due to the change of the members of the cluster managed per respective representative nodes. Further, clusters are generated or deleted by the relay devices changing into representative nodes or representative nodes reverting to ordinary relay devices.

For such change of the size, generation, or deletion of the cluster based on the change in the communication quality, the representative node in the cluster compares its own communication quality with the communication quality of other member nodes in Embodiment 3. Based on the comparison, the representative node switches the role of the representative node to the relay device having lower communication quality than the representative node, and turns over the management of the cluster. By doing so, without making a new cluster, the relay device can follow flexibly to the change in the communication quality caused near the cluster and can manage the cluster.

Figure 21:
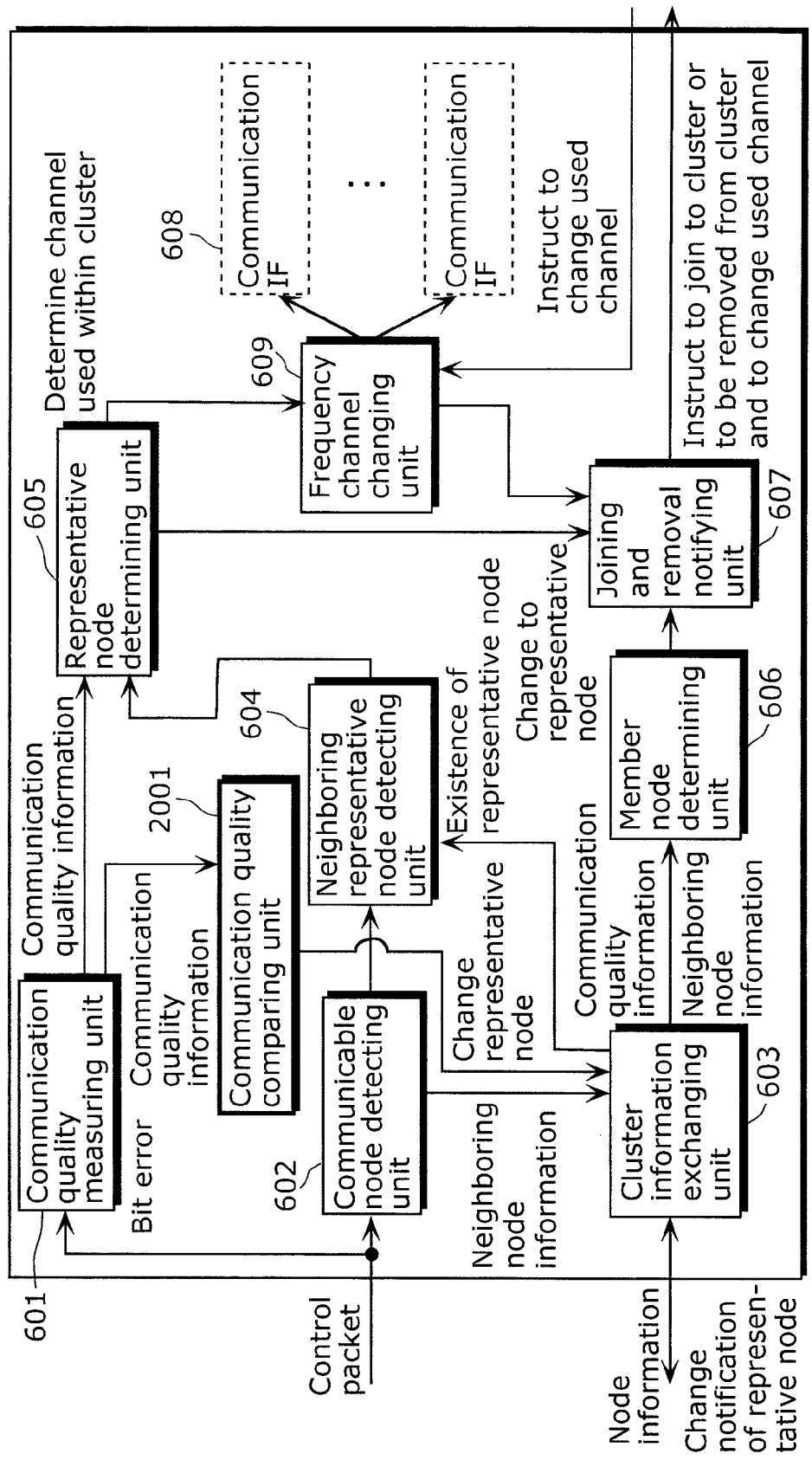
FIG. 21 is a block diagram showing a configuration of a relay device according to Embodiment 3.

FIG. 21 is a block diagram showing a configuration of a relay device according to Embodiment 3. The relay device according to the present embodiment has a communication quality comparing unit 2001 in addition to the configuration of the relay device according to Embodiment 1 shown in FIG. 6. Note that the same elements as those included in the relay device in Embodiment 1 shown in FIG. 6 are assigned with the same referential number as in FIG. 6, and the descriptions thereof are not repeated.

The communication quality comparing unit 2001 refers to, when its own relay device is a representative node, the neighboring node information and changes the neighboring node having lower communication quality than predetermined value into a new representative node instead of itself.

The relay device according to Embodiment 3 executes the processes identical to the processes that the relay device according to Embodiment 1 executes. However, the relay device according to Embodiment 3 additionally executes the process shown in FIG. 22.

Figure 22:
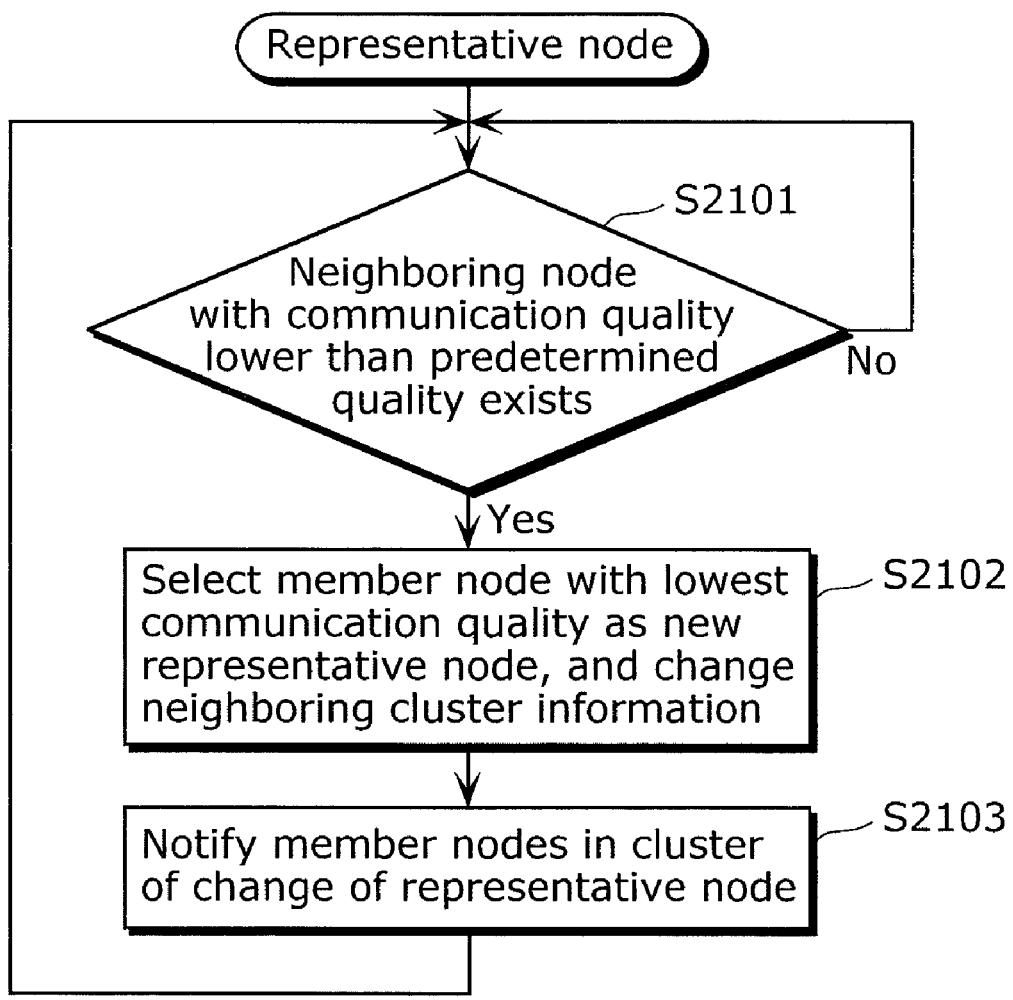
FIG. 22 is a flow chart showing an operation for changing a representative node.

FIG. 22 is a flow chart showing an operation for changing the representative node. This process is performed by the representative node.

The communication quality comparing unit 2001 of the representative node refers to the neighboring node information 901 stored in the communication quality measuring unit 601 to determine whether or not there are any neighboring nodes having communication quality lower than predetermined quality (for example, bit error rate of 5%) (S2101). When there is no neighboring node having lower communication quality (No in S2101), the communication quality comparing unit 2001 repeats the process of S2101.

When there is a neighboring node having the communication quality lower than the predetermined quality (Yes in S2101), the communication quality comparing unit 2001 changes the representative node identification information of the neighboring cluster information 11 stored in the cluster information exchanging unit 603 from "Yes" to "No". In addition, the communication quality comparing unit 2001 changes the representative node identification information of the neighboring node having the lowest communication quality among the neighboring nodes from "No" to "Yes" (S2102).

Next, the cluster information exchanging unit 603 notifies the member nodes of the representative node change information that is information for changing the representative node of the cluster (S2103).

Figure 23:
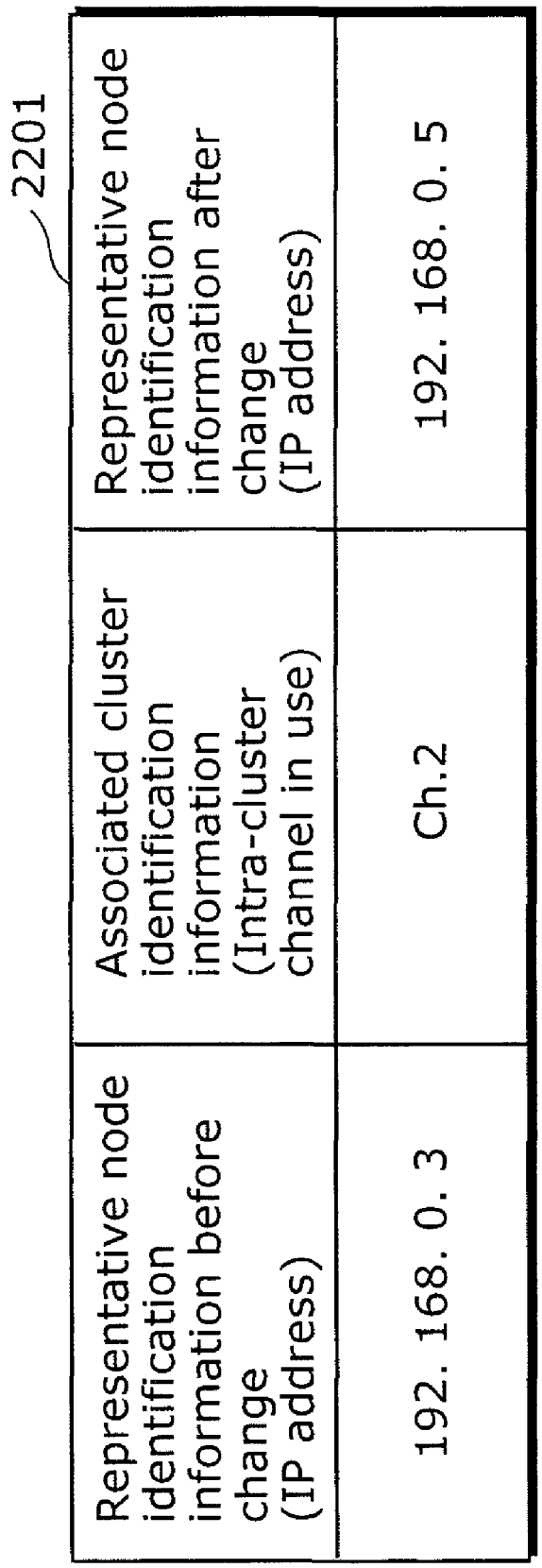
FIG. 23 is a diagram showing details of representative node change information.

Here, an example of the representative node change information is shown in FIG. 23.

The representative node change information 2201 is information that is transmitted from the representative node before the change to the member nodes of the cluster. The representative node change information 2201 includes representative node identification information before the change, associated cluster identification information, and representative node identification information after the change.

The representative node identification information before the change is information for identifying the representative node before the change. The associated cluster identification information is information for identifying the cluster with which the representative node before the change was associated. The representative node identification information after the change is information for identifying the representative node after the change.

The representative node identification information before the change and the representative node identification information after the change are not limited and may be any information, such as an IP address, as long as each relay device can be uniquely identified.

Further, the associated cluster identification information includes the same content as the associated cluster identification information included in the cluster information 1001 in FIG. 10; and thus, descriptions thereof are not repeated.

The representative node repeats the operations of S2101 to S2103. With this, the representative node changes the relay device having the lowest communication quality among the relay devices having the communication quality lower than the predetermined quality in the same cluster, into the representative node.

Figure 24:
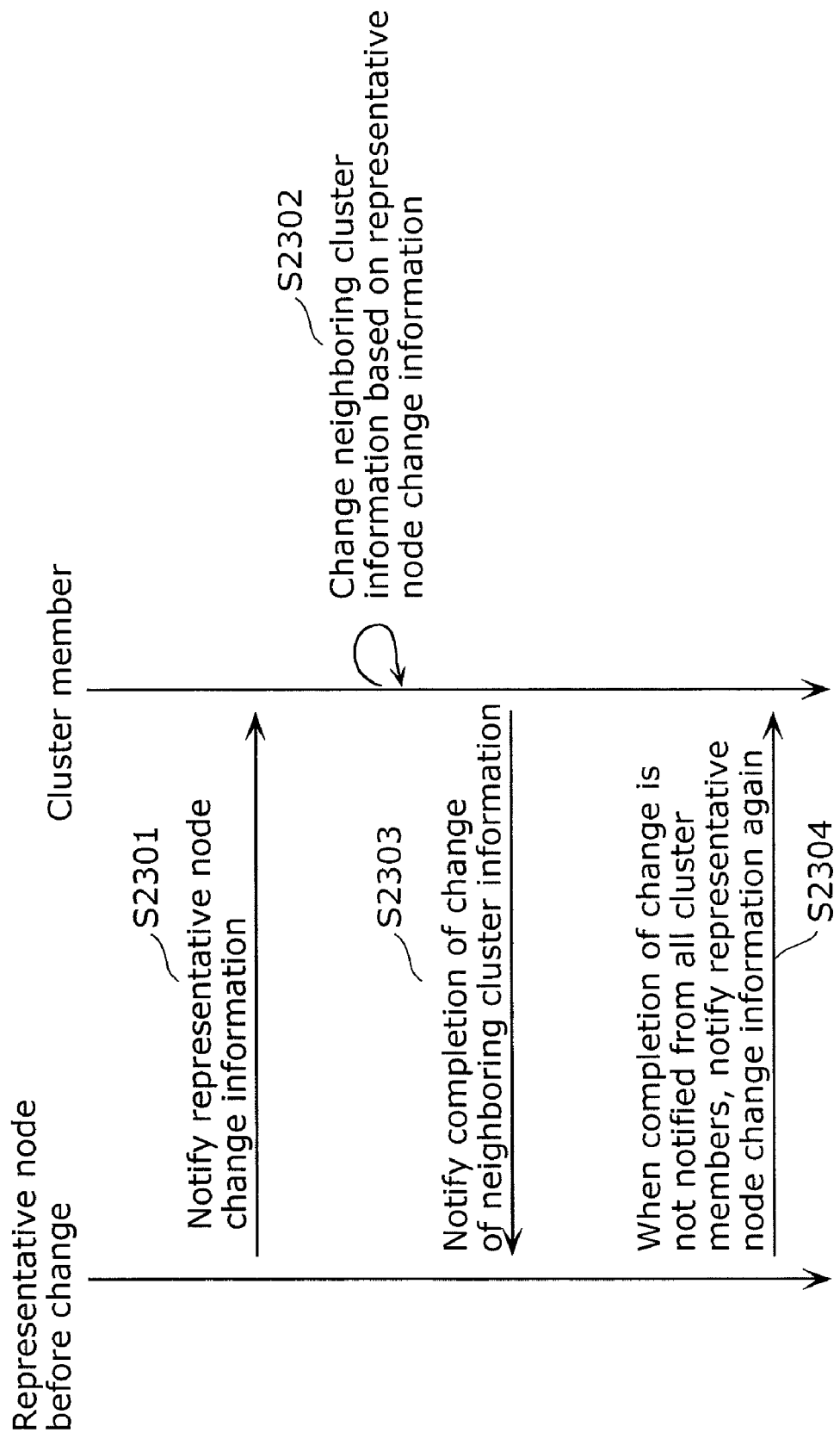
FIG. 24 is a time chart showing an operation for a representative node notifying member nodes that the representative node has been changed.

FIG. 24 is a time chart showing an operation for the representative node notifying the member nodes that the representative node has been changed.

The cluster information exchanging unit 603 of the representative node notifies the cluster members of the representative node change information 2201 (S2301).

The member nodes receive the representative node change information 2201. The cluster information exchanging unit 603 of each member node specifies, from the received representative node change information 2201, the representative node before the change and the representative node after the change. The cluster information exchanging unit 603 interchanges, in the neighboring cluster information 1101, the values of the representative node identification information of the representative node before the change and the representative node after the change that are specified (S2302).

When the cluster information exchanging unit 603 of each member node completes changing the content of the neighboring cluster information 1101, the cluster information exchanging unit 603 notifies the representative node before the change that the change of the neighboring cluster information is completed (S2303).

By the operations from S2301 to S2303 above, the change of the representative node is made to all the relay devices in the same cluster.

In the case where the representative node before the change does not receive the notification of the completion of the change of the neighboring cluster information 1101 from every member node within a certain period of time, there is a possibility that the change of the representative node was not made properly to all the relay devices in the cluster. Thus, the representative node before the change notifies the member nodes of the representative node change information 2201 again (S2304).

With the configuration and operations described above, the relay devices according to Embodiment 3 can preferentially and dynamically assign the intra-cluster channel to the cluster for the area which always have significant degradation in the communication quality, even when the frequency channel are changed in the respective relay devices, additional relay devices are provided, the relay devices are moved, or the surrounding transmission environment of radio waves varies.

Embodiment 4

Next, Embodiment 4 of the present invention is described.

In the above embodiments, as the intra-cluster channel that is used in the communication between the member nodes in each cluster, the frequency channel which causes less interference with neighboring clusters is assigned. Further, degradation in the quality of multi-hop communication is suppressed by repeating the relaying within each cluster and between the clusters in multi-states (multi-hops).

However, in the wireless mesh network where a mobile terminal such as a portable terminal or a terminal built in a vehicle serves as a relay device, when such mobile terminal becomes the representative node of the cluster, the cluster itself moves along with the representative node.

Such a movement of the cluster may cause a condition where the moved cluster becomes adjacent with another cluster which uses the same frequency channel as the intra-cluster channel. Thus, a path is generated on which the same frequency channel is consecutively used in the multi-hop communication, which results in degrading communication quality.

Thus, in Embodiment 4 of the present invention, the respective relay devices exchange their location information to each other. Then, the representative node switches the role of the representative node to the member node which is located closer to the center (centroid) of the cluster in accordance with the change in the location of the member node or of the representative node itself due to relocation, and turns over the management of the cluster. With this, it is possible to provide a relay device which can suppress significant movement of the whole cluster.

Figure 25:
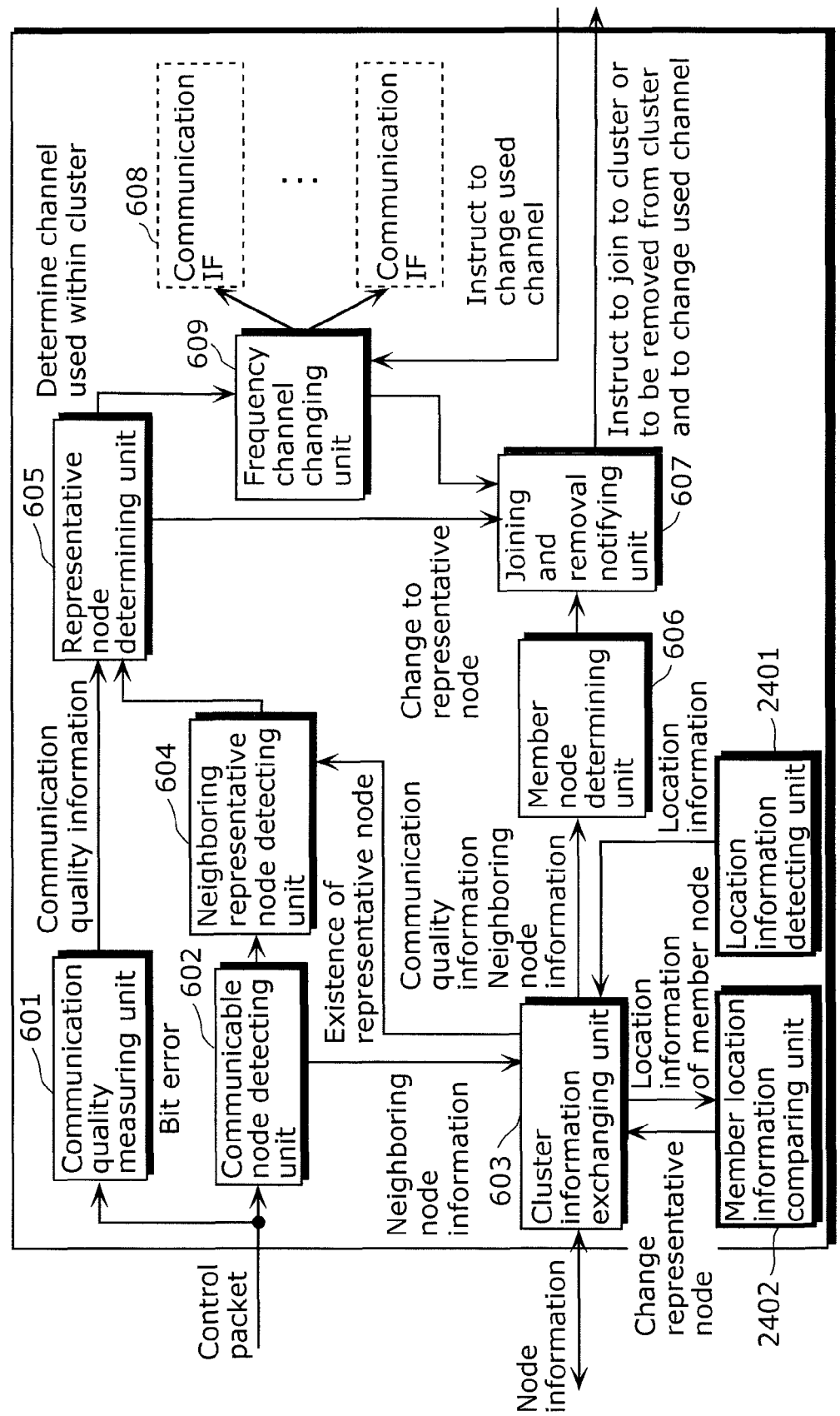
FIG. 25 is a block diagram showing a configuration of a relay device according to Embodiment 4.

FIG. 25 is a block diagram showing a configuration of a relay device according to Embodiment 4. The relay device according to the present embodiment includes a location information detecting unit 2401 and a member location information comparing unit 2402 in addition to the configuration of the relay device according to Embodiment 1 shown in FIG. 6. Note that the same elements as those included in the relay device according to Embodiment 1 shown in FIG. 6 are assigned with the same referential numbers as in FIG. 6, and the descriptions thereof are not repeated.

The location information detecting unit 2401 is a processing unit, such as a global positioning system (GPS), which obtains location information of the relay device. The device used as the location information detecting unit 2401 may be other than the GPS, and is not particularly limited as long as the device specifies the location of the relay device, such as a location detecting device using a camera, a radio frequency identification (RFID) tag, a magnetic sensor or the like.

The member location information comparing unit 2402 is a processing unit which compares the location relationship of the member nodes in the cluster and determines whether to change the representative node based on the comparison result.

The relay device according to Embodiment 4 executes the processes identical to the processes that the relay device according to Embodiment 1 executes. However, the relay device according to Embodiment 4 additionally executes the processes shown in FIG. 26 and FIG. 29.

Figure 26:
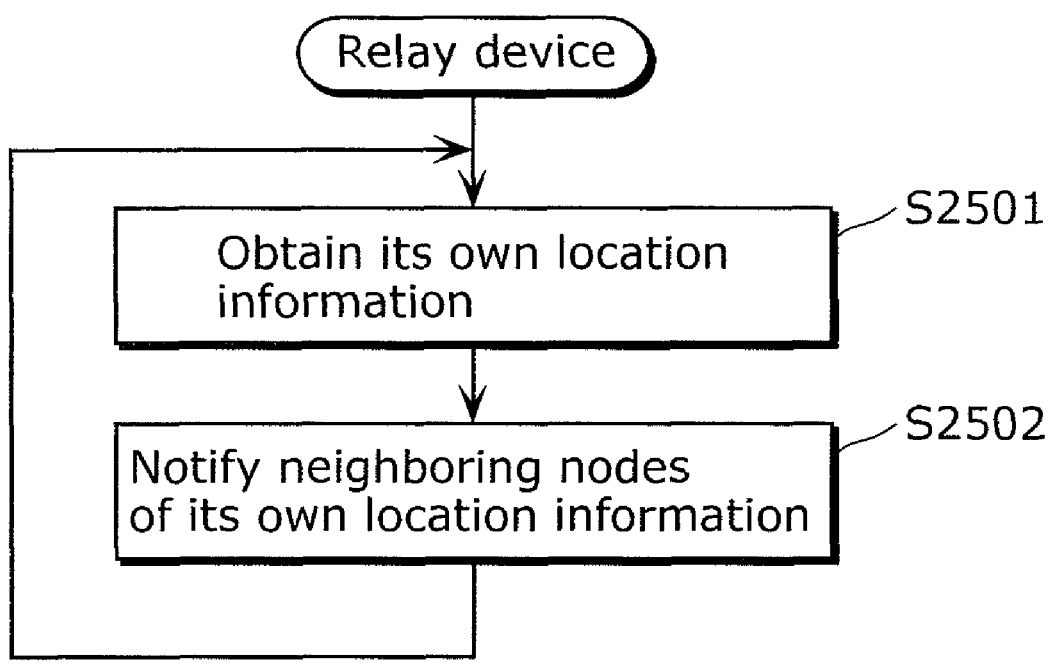
FIG. 26 is a flow chart showing an operation performed in a relay device for obtaining its own location information and sharing location information with neighboring nodes.

FIG. 26 is a flow chart showing an operation for obtaining location information of a relay device and sharing location information with neighboring nodes.

The location information detecting unit 2401 of each relay device obtains its own location information (S2501).

Next, the cluster information exchanging unit 603 notifies the neighboring nodes of its own location information using the cluster information (S2502).

Here, the details of the cluster information according to Embodiment 4 are described with reference to FIG. 27.

Cluster information 2601 is information that is notified to the neighboring node by the cluster information exchanging unit 603 of each relay device. The cluster information 2601 is the cluster information 1001 shown in FIG. 10 with location information added. In the cluster information 2601, the source node identification information, the neighboring node identification information, the associated cluster identification information, the representative node identification information are the same as the corresponding information included in the cluster information 1001 shown in FIG. 10. Therefore, the descriptions of them are not repeated.

The location information of the cluster information 2601 includes location information for identifying the location of its own relay device. For example, the location information includes information on latitude, longitude, and altitude of the relay device that are obtained by GPS.

Further, FIG. 28 shows an example of neighboring cluster information stored in the cluster information exchanging unit 603.

The neighboring cluster information 2701 is information in which the cluster information of its own relay device and the cluster information of the neighboring nodes are separately stored. The neighboring cluster information 2701 is the neighboring cluster information 1101 shown in FIG. 11 with location information added. In the neighboring cluster information 2701, the node identifier, the neighboring node identification information, the associated cluster identification information, and the representative node identification information are the same as the corresponding information included in the neighboring cluster information 1101 shown in FIG. 11. Therefore, the descriptions of them are not repeated.

The location information of the neighboring cluster information 2701 includes the location information which specifies the location of its own relay device and the location of the neighboring nodes. For example, the location information includes information on latitude, longitude, and altitude of the respective relay devices obtained by GPS.

Each relay device shares the location information with other relay devices by repeating the operations of S2501 and S2502.

Figure 29:
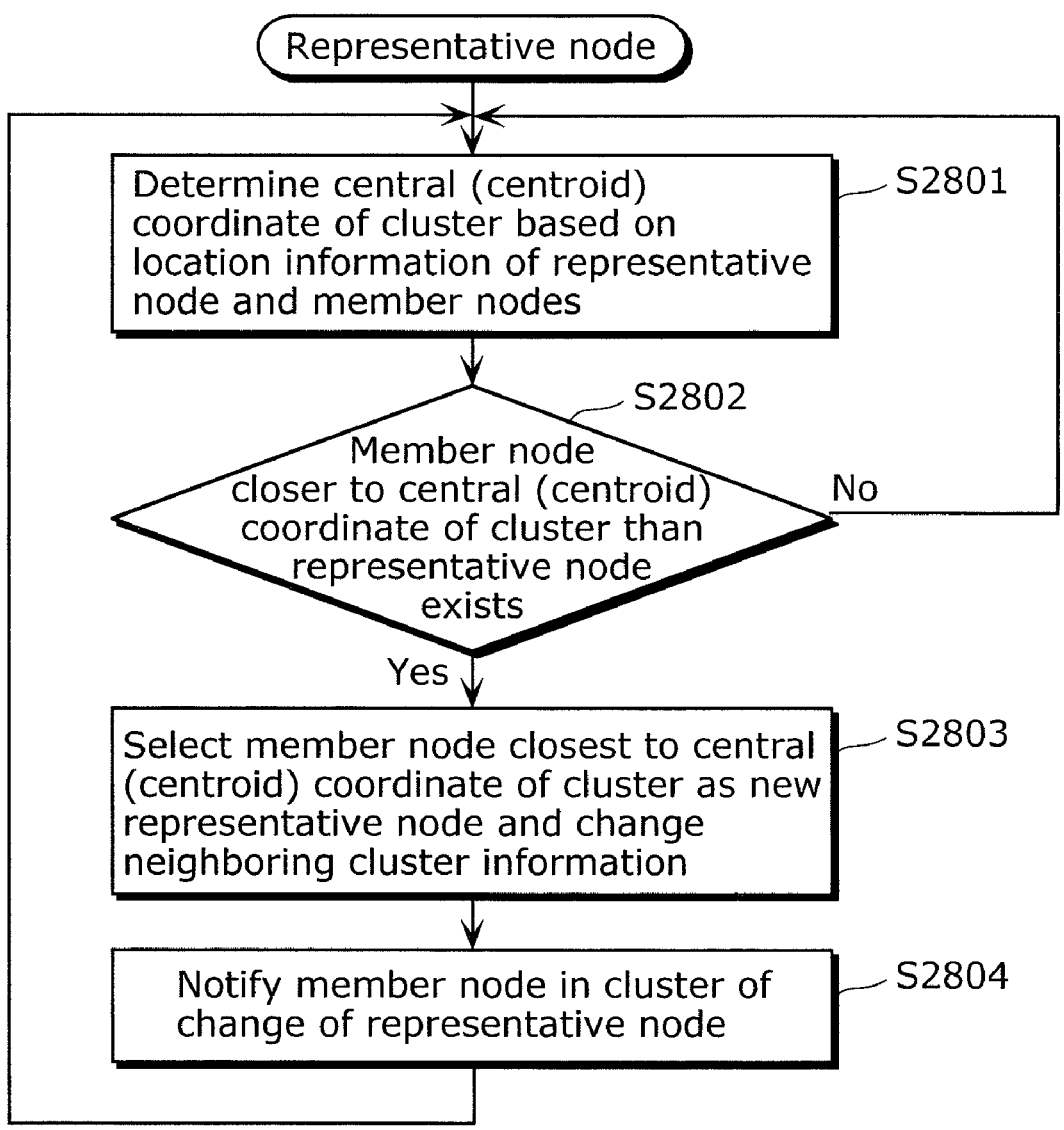
FIG. 29 is a flowchart showing a process for changing the representative node based on location information of the relay devices.

FIG. 29 is a flowchart showing a process for changing representative node based on the location information of the relay device. The following process is performed by the representative node.

The member location information comparing unit 2402 of the representative node refers to the neighboring cluster information 2701 stored by the cluster information exchanging unit 603. With this, the central (centroid) coordinate of the cluster is calculated from the coordinates of the locations of the relay devices associated with the same cluster as the representative node (S2801).

The member location information comparing unit 2402 determines whether or not the representative node itself is the closest to the central (centroid) coordinate of the cluster (S2802). When the representative node itself is closest to the central (centroid) coordinate of the cluster (No in S2802), the process continues at S2801.

When there is a member node which is closer to the central (centroid) coordinate of the cluster than the representative node (Yes in S2802), the member location information comparing unit 2402 changes the status of the representative node identification information of the neighboring cluster information 2701 stored by the cluster information exchanging unit 603 from "Yes" to "No". In addition, the member location information comparing unit 2402 changes the status of the representative node identification information for the relay device closest to the central (centroid) coordinate of the cluster among the member nodes from "No" to "Yes" (S2803).

Next, the cluster information exchanging unit 603 notifies the member nodes of the representative node change information that is information for changing the representative node of the cluster (S2804).

The details of the representative node change information and the operation for notifying the representative node change information according to Embodiment 4 are the same as those in Embodiment 3; and thus, descriptions thereof are not repeated.

In such a manner, by repeating the operations from S2801 to S2804, it is possible to always select the relay device that is closest to the central (centroid) coordinate of the cluster as a representative node. With this, change in location of the whole cluster due to movement of the representative node can be suppressed, thereby preventing degradation in communication quality caused due to the change in the location of the cluster.

Embodiment 5

Next, Embodiment 5 of the present invention is described.

In the above embodiments, the representative node in each cluster is determined out of relay devices having poor transmission quality by the representative node determining unit 605. Further, the representative node determines which member node is to be joined to and removed from the cluster that the representative node manages, and determines the frequency channel to be used in the cluster.

In Embodiment 5, in the case where the place where the cluster is to be placed and the frequency channel to be used are predetermined, a relay device that will serve as a representative node is prefixed in order to reduce power consumption and implementation cost of the relay device. As a result, a process for determining a representative node can be omitted, and a function as a representative node can be removed from a relay device that will serve as a member node.

Figure 30:
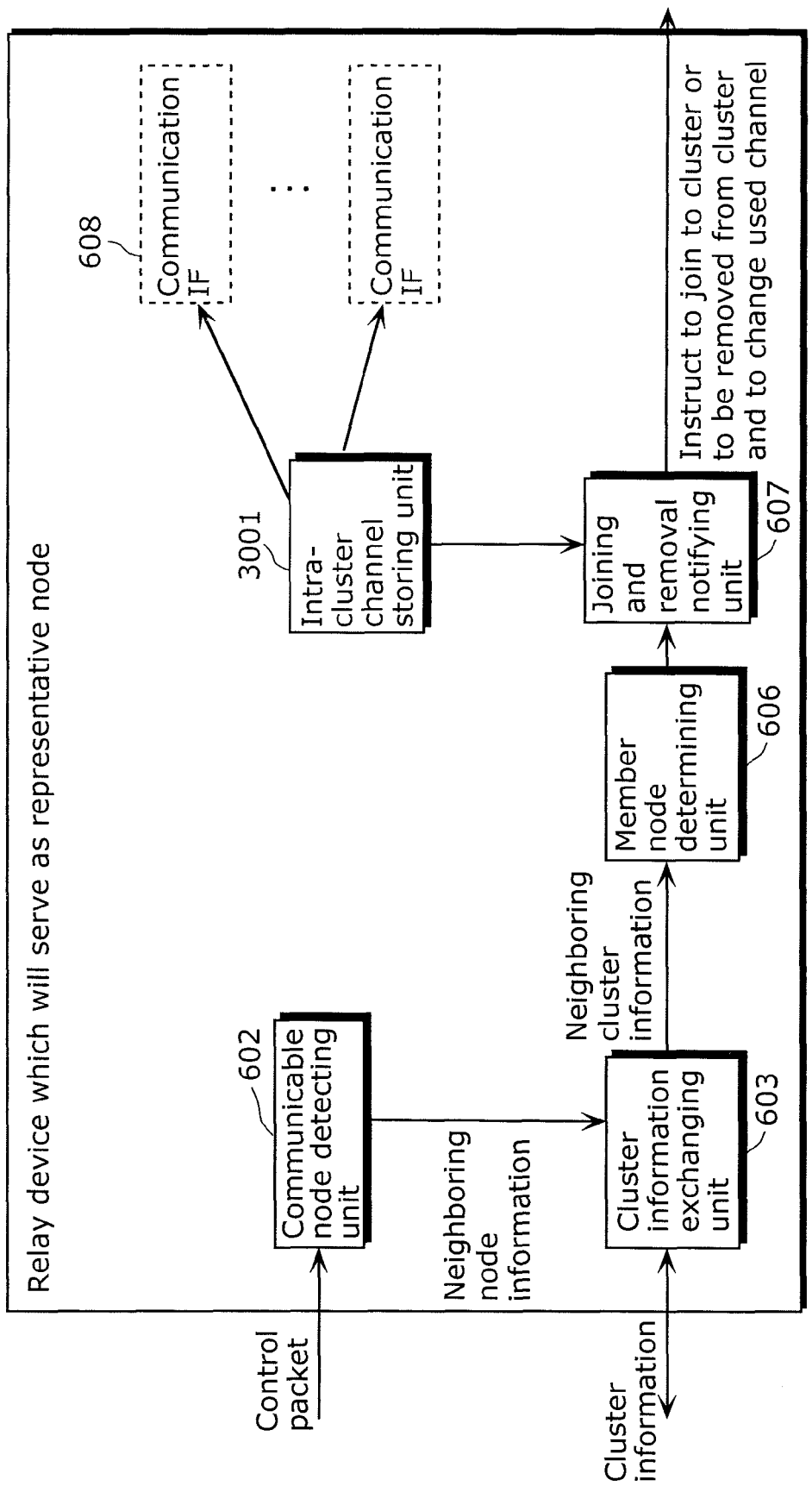
FIG. 30 is a block diagram showing a configuration of a relay device which will become a representative node according to Embodiment 5.

FIG. 30 is a block diagram showing a configuration of the relay device that will serve as a representative node according to Embodiment 5.

In Embodiment 5, since the representative node is predetermined, it is not necessary that every relay device includes a configuration necessary for determining a representative node and changing an intra-cluster channel. Further, the intra-cluster channel is predetermined, and stored by an intra-cluster channel storing unit 3001. It is to be noted that the same configuration as in FIG. 6 are assigned with the same referential numbers, and descriptions thereof are not repeated.

In the representative node, when the member node determining unit 606 determines a relay device to be joined to or removed from the cluster that the representative node manages, the joining and removal notifying unit 607 instructs the relay device to join to or be removed from the cluster. Further, when the relay device to be joined to the cluster is determined, the joining and removal notifying unit 607 instructs at least one of the communication interfaces 608 of the relay device to be removed to change the frequency channel to the frequency channel stored in the intra-cluster channel storing unit 3001. Details of the method for the representative node selecting a relay device to be joined to or removed from the cluster is the same as those described with reference to FIG. 14 and FIG. 15; and thus, their descriptions are not repeated.

Figure 31:
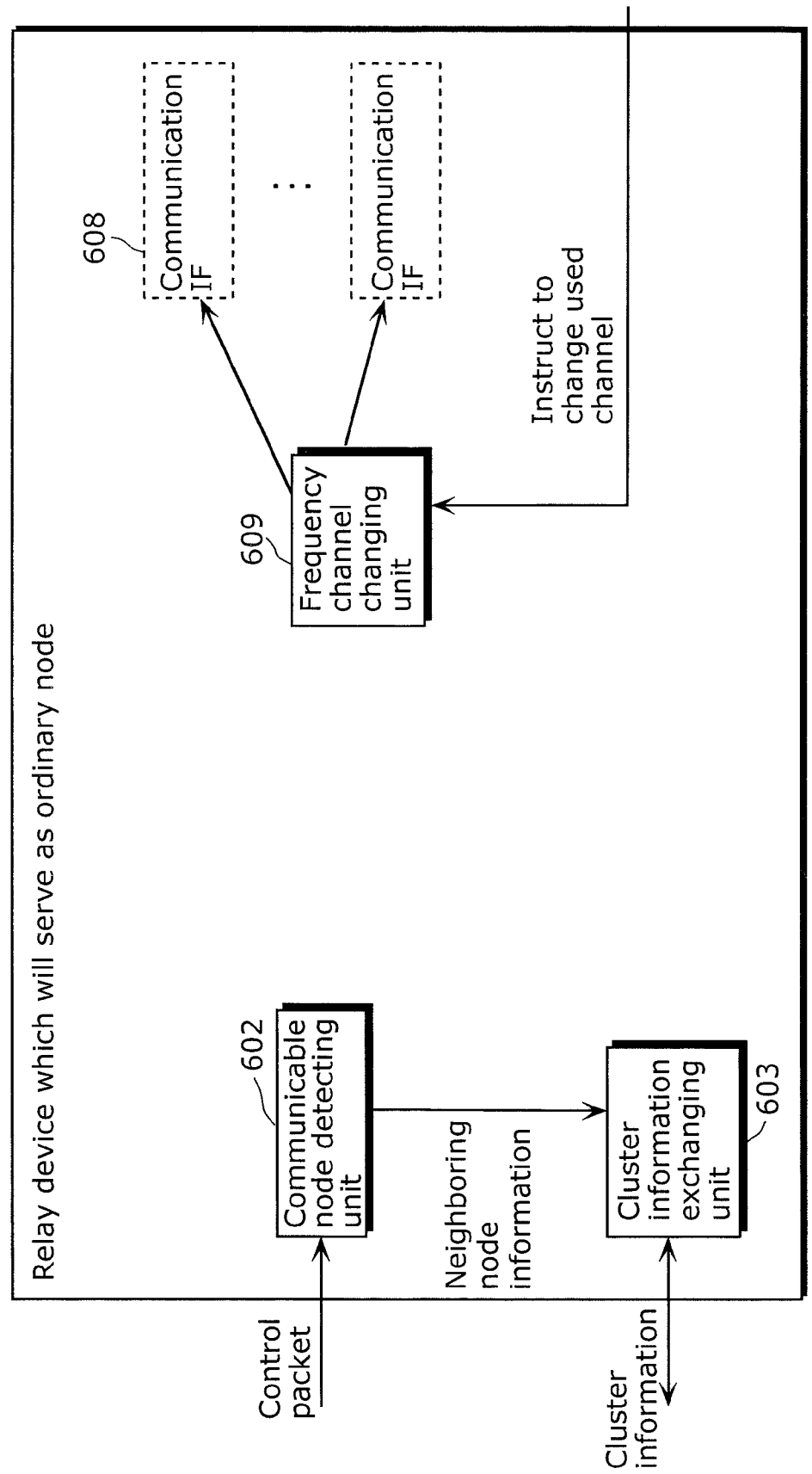
FIG. 31 is a block diagram showing a configuration of a relay device which will become a member node according to Embodiment 5.

FIG. 31 is a block diagram showing a configuration of a relay device that will serve as a member node according to Embodiment 5.

Like numbers are used for like configurations as in FIG. 6; and their descriptions are not repeated.

The relay device which will serve as a member node detects neighboring nodes which can be communicated with in a single hop by the communicable node detecting unit 602. Further, the relay device exchanges, with other relay devices that can be communicated with in a single hop, information of neighboring nodes which can communicate with each other in a single hop as cluster information by the cluster information exchanging unit 603. In addition, in the case where the relay device receives a request from the representative node to join to or be removed from the cluster, the frequency channel changing unit 609 in the relay device changes the frequency channel used by the communication interface 608. It is to be noted that the details of the method for the representative node selecting a relay device to be joined to or removed from the cluster is the same as those described with reference to FIG. 16 and FIG. 17; and thus, their descriptions are not repeated.

As described, in the case where the location where the cluster is to be placed and assignment of the frequency channel used are determined in advance, the relay device which will serve as a representative node is prefixed. As a result, power consumption required for determining the representative node can be reduced, and implementation cost can be reduced due to reduced configuration of the relay device which will serve as a member node.

FIG. 32A to FIG. 32D are diagrams showing examples of the application of the present invention and their advantageous effects.

Figure 32A:
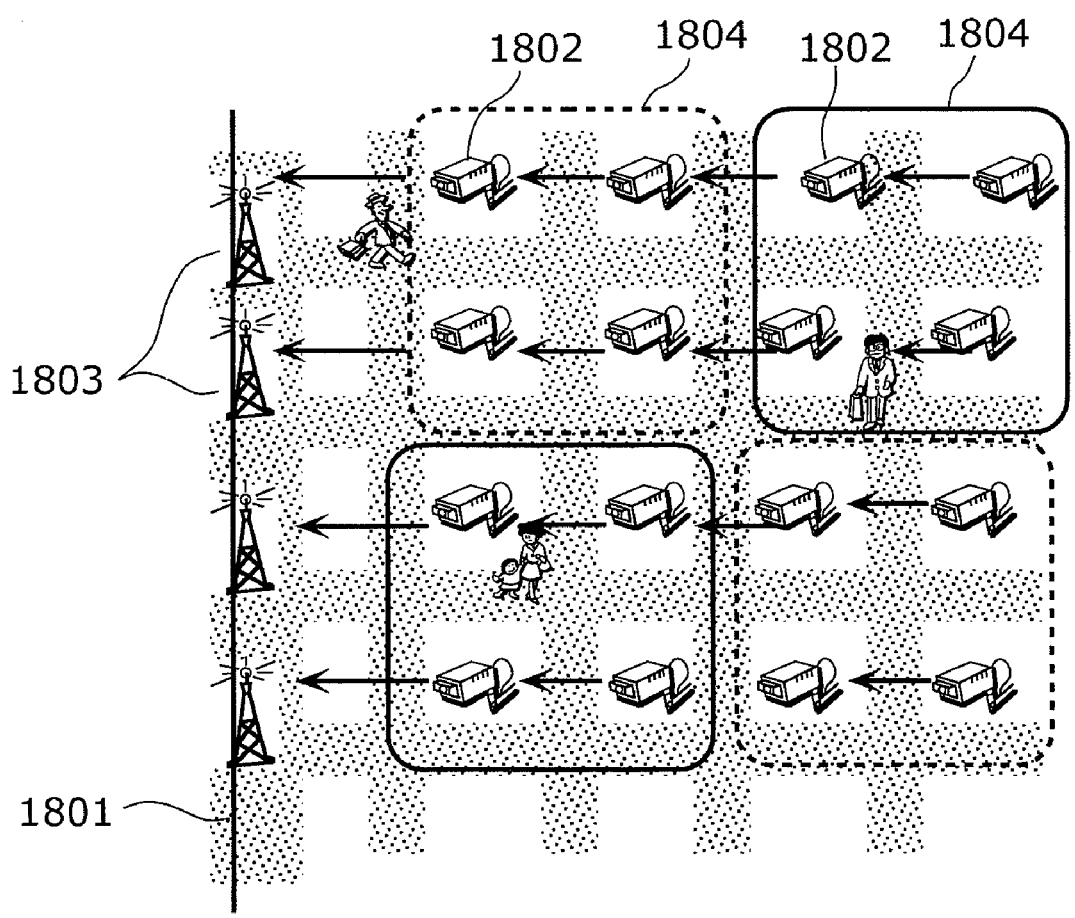
FIG. 32A is a diagram showing an example of the application of the present invention.

FIG. 32A is a system for monitoring business district or residential district (town monitoring). In this system, an example is shown where videos captured by monitoring cameras 1820 placed on back streets are relayed to gateways 1803 connected to a backbone network 1801 via wireless mesh networks. In FIG. 32A, the wired backbone network 1801 is installed in a main line running near the business district and the residential district, and relay devices (now shown) that perform wireless communications are placed at the intersection of the backstreets. Further, the monitoring cameras 1802 installed for monitoring town or people are wirelessly connected to nearby relay devices.

The wireless mesh network can readily provide communication infrastructures by simply providing relay devices to places, such as backstreets of business districts or residential districts, where installation of wired networks are physically or economically difficult. However, depending on placement of backstreets and installation of the monitoring cameras 1802, the monitoring cameras 1802 and relay devices are densely placed. As a result, when video traffic is relayed in multi-hop, interference of wireless packets occurs, causing degradation or delay in video at the receiving side.

For this, by using the relay device according to the present invention, clusters 1804 are formed in a distributed autonomous way in accordance with the placement of the installed relay devices. Further, frequency channels which do not cause interference between the clusters 1804 are assigned to each relay device. This allows the group of relay devices densely arranged to operate as a single virtual relay device. Accordingly, interference of the wireless packets due to dense arrangement of the relay devices can be alleviated, allowing monitoring through high-quality video with less quality degradation such as loss or delay.

Figure 32B:
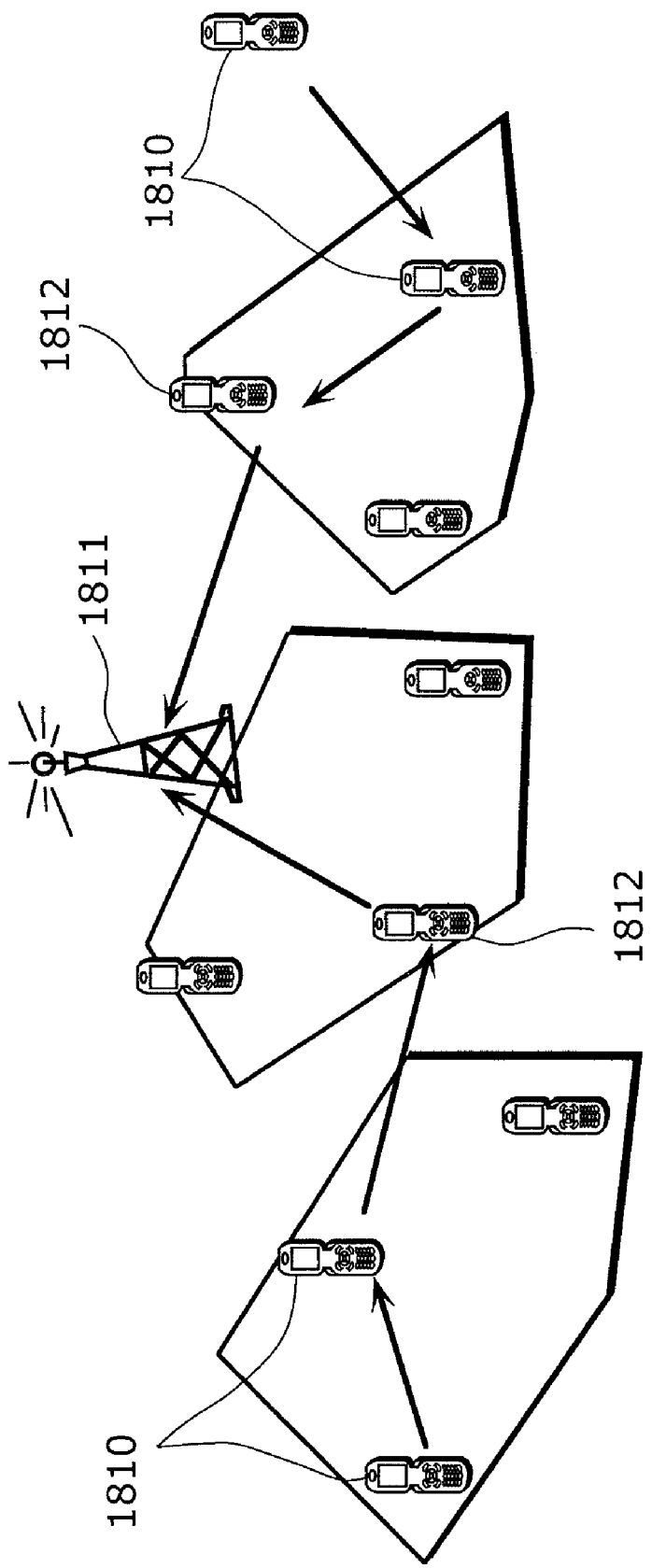
FIG. 32B is a diagram showing another example of the application of the present invention.
Figure 32C:
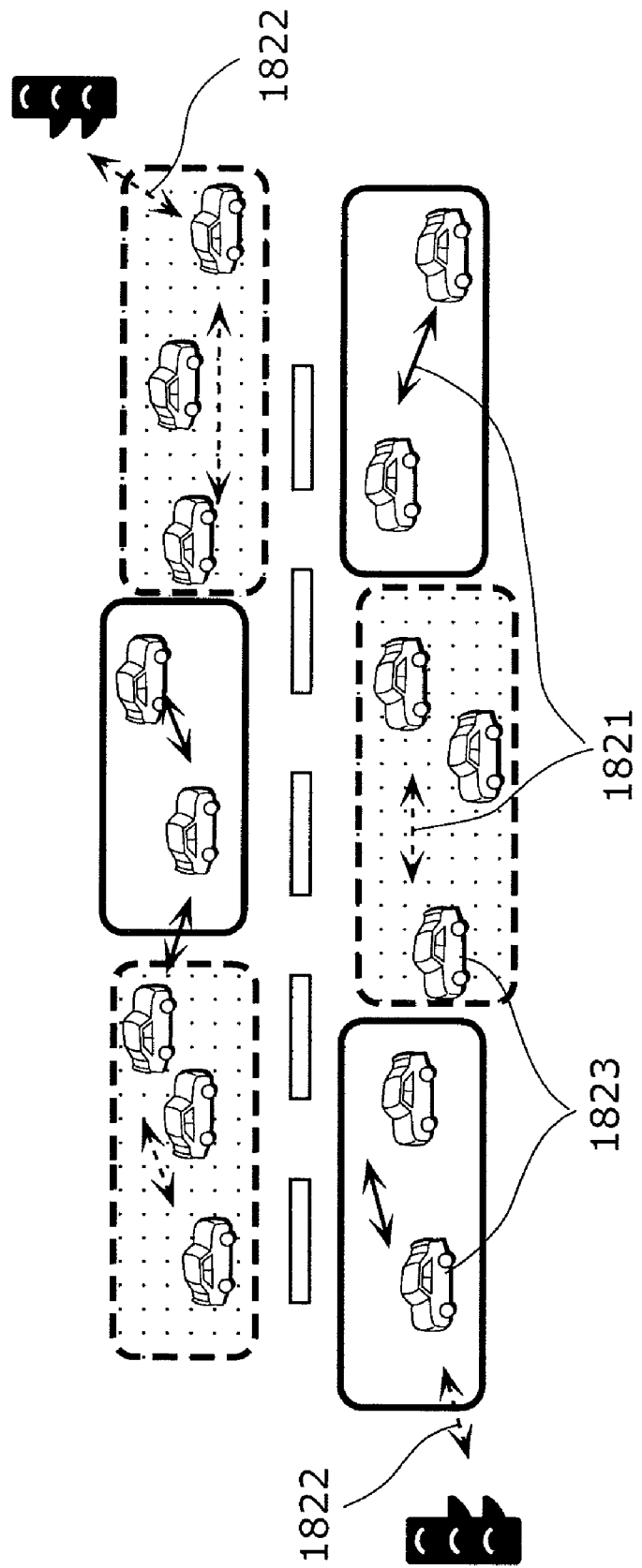
FIG. 32C is a diagram showing yet another example of the application of the present invention.
Figure 32D:
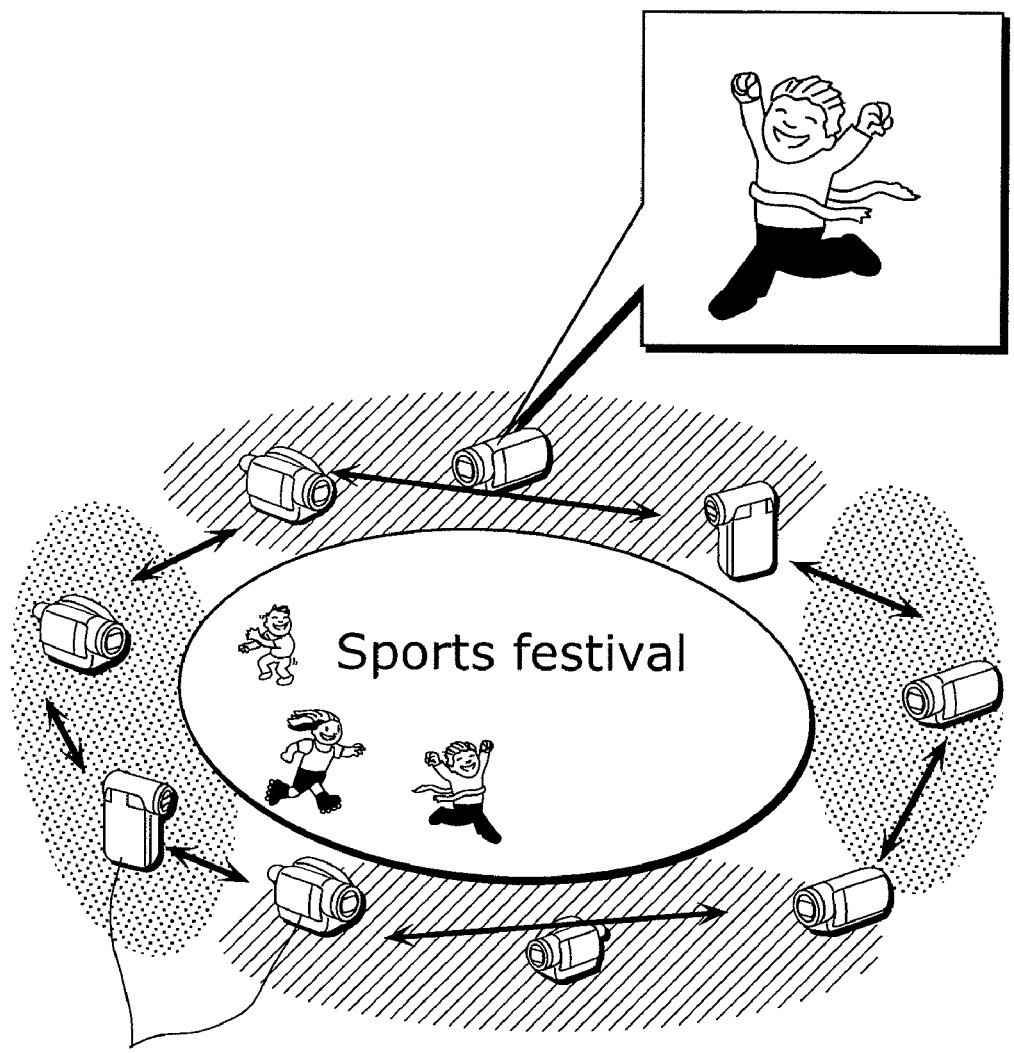
FIG. 32D is a diagram showing yet another example of the application of the present invention.

FIG. 32B, FIG. 32C, and FIG. 32D are diagrams showing examples of the application of the present invention in wireless mesh networks including mobile relay devices.

FIG. 32B is a diagram showing an example where sound data, video data and the like of a mobile phone 1810 which is in out of service area of a base station 1811 are relayed to the base station 1811 via several mobile phones 1810 and 1812. This is for expanding usable area of the mobile phones 1810 and 1812. Specific examples of possible situations of FIG. 32B include underground mall or a business complex such as a department store, where people who use the mobile phones 1810 and 1812 are densely located and unreachable area of radio waves of the base station 1811 are likely to be found. In addition, each mobile phone 1810 and 1812 includes a function to relay data from other mobile phones 1810 or 1812.

FIG. 32C is a diagram showing an example where audio data, video data and the like are communicated in multi-hop through vehicle-to-vehicle communication 1821 or road-to-vehicle communication 1822. Specific examples of possible situations of FIG. 32C include the situation where vehicles 1823 move relatively slowly and countless vehicles 1823 are densely present, such as at the time of waiting at a red light or heavy traffic. Further, each vehicle 1823 has a function to relay data that comes from another vehicle 1823.

FIG. 32D shows a situation where a number of people are capturing video of an event, such as a sports festival, using video cameras 1831 from various locations at the same time. In this situation, the video captured from different locations are shared through the wireless relaying function of video data which is included in each video camera 1831. Specific examples of possible situations of FIG. 32D include, not only sports festivals, but also stage performances at school festivals, or sports games such as soccer or baseball.

In the case where the present invention is applied in FIGS. 32B, 32C, and 32D, the representative node always manage the joining to or removal from clusters of mobile relay devices (the mobile phones 1810 and 1812 and video cameras 1831). Thus, along with the movement of each relay device, changes of members of clusters and assignment of frequency channels are performed in a distributed autonomous way. This alleviates interference of wireless packets also in a situation where mobile relay devices are densely used. As a result, high-quality video data and audio data can be communicated with less quality degradation such as loss or delay.

As described so far, according to the embodiments above, a number of relay devices can operate as a single virtual relay device in a wireless mesh network. Thus, interference of wireless packets can be prevented, suppressing degradation in communication quality.

With this, the relay device and the relay method according to the present invention can achieve high-quality transmission of video and audio in wireless mesh networks in which relay devices are used in a dense arrangement. Further, the relay device and the relay method according to the present invention are applicable to in-house monitoring, town-monitoring, intelligent transport systems (ITS) and the like.

Furthermore, the relay device and the relay method according to the present invention are applicable to transmission of various media including, not only the video and audio, but also text, still images and music, allowing high-quality media transmission including both in-house and outside-house transmission. Further, the present invention allows high quality in not only real-time media transmission using UDP or TCP, but also non-real-time media transmission such as downloading Web or data.

Further, the relay device described in the above embodiments may be implemented by a general computer including a processor, a memory, and a communication interface. The relay device is implemented by storing various data in the memory, and causing the processor to execute a program for executing each processing unit.

Further, above embodiments may be combined.

Industrial Applicability

The present invention can be applied to relay devices or the like which achieve high-quality data transmission in wireless mesh networks where fixed terminals and mobile terminals are connected.

REFERENCE SIGNS LIST 401, 406, 1902, 1902a to f Relay devices
403 Neighboring cluster
601 Communication quality measuring unit
602 Communicable node detecting unit
603 Cluster information exchanging unit
604 Neighboring representative node detecting unit
605 Representative node determining unit
606 Member node determining unit
607 Joining and removal notifying unit
608 Communication interface
609 Frequency channel changing unit
901 Neighboring node information
1001, 2601 Cluster information
1101, 2701 Neighboring cluster information
1601 Member counting unit
1602 Wireless output adjusting unit
1801 Backbone network
1802 Monitoring camera
1803 Gateway
1804 Cluster
1810, 1812 Mobile phones
1811 Base station
1831 Video camera
1901, 1901a, 1901b Terminals
2001 Communication quality comparing unit
2201 Representative node change information
2401 Location information detecting unit
2402 Member location information comparing unit
3001 intra-cluster channel storing unit

The invention claimed is:

1. A relay device comprising:
a representative node determining unit configured to determine, when communication quality of said relay device does not meet predetermined quality and a representative node does not exist among at least one neighboring node, a channel used for intra-cluster communication in a cluster of said relay device to be a channel different from a channel used for intra-cluster communication in a neighboring cluster so that said relay device serves as the representative node, the cluster being formed of relay devices that share a common channel used for data communication, the intra-cluster communication being communication with at least another relay device in a same cluster, the at least one neighboring node being a neighboring relay device which can communicate with said relay device, the representative node being a representative relay device which determines a channel used for the intra-cluster communication;
a notifying unit configured to notify the at least another relay device in the cluster of said relay device about the channel determined by said representative node determining unit;
a joining unit configured to allow a neighboring node which is not associated with any cluster among the at least one neighboring node to join the cluster of said relay device by causing the neighboring node to use, for the intra-cluster communication, the channel determined by said representative node determining unit, when said relay device is the representative node; and
a channel changing unit configured to change the channel used for the intra-cluster communication to the channel determined by said representative node determining unit of the representative node.

2. The relay device according to claim 1, further comprising:
a removing unit configured to remove, from the cluster of said relay device, a relay device having communication quality that does not meet the predetermined quality by prohibiting the relay device from using the channel used for the intra-cluster communication in the cluster of said relay device, the communication quality being quality of communication between the relay device and an every other relay device in the cluster of said relay device.

3. The relay device according to claim 2,
wherein said removing unit is further configured to remove the relay device having the communication quality that does not meet the predetermined quality from the cluster of said relay device by prohibiting the relay device from using the channel used for the intra-cluster communication in the cluster of said relay device, when the relay device requests said relay device to remove the relay device from the cluster of said relay device, the communication quality being quality of the communication between the relay device and the every other relay device in the cluster of said relay device.

4. The relay device according to claim 1, further comprising:
a relay device counting unit configured to count the number of relay devices associated with the cluster of said relay device; and
a wireless output adjusting unit configured to reduce a communication output of a communication interface till the number of the relay devices counted by said relay device counting unit reaches a predetermined value.

5. The relay device according to claim 1, further comprising
a first representative node switching unit configured to switch, when said relay device is the representative node, a role of the representative node from said relay device to one of the at least one neighboring node, the one of the at least one neighboring node having communication quality lower than the predetermined quality.

6. The relay device according to claim 5, further comprising:
a communicable node detecting unit configured to detect the at least one neighboring node by transmitting and receiving predetermined data to and from a relay device; and
a communication quality measuring unit configured to measure communication quality of the at least one neighboring node detected by said communicable node detecting unit, wherein said first representative node switching unit includes:
a communication quality comparing unit configured to specify, when said relay device is the representative node, the one of the at least one neighboring node by comparing the communication quality of the at least one neighboring node measured by said communication quality measuring unit with the predetermined quality, the one of the at least one neighboring node having communication quality lower than the predetermined quality; and
a notifying unit configured to notify the at least another relay device in the cluster of said relay device that the role of the representative node is switched from said relay device to the one of the at least one neighboring node specified by said communication quality comparing unit.

7. The relay device according to claim 1, further comprising:
a location information detecting unit configured to detect location information of said relay device;
a location information obtaining unit configured to obtain, from the at least another relay device in the cluster of said relay device, location information of the at least another relay device;
a centroid location determining unit configured to determine a centroid location of the cluster of said relay device based on the location information of said relay device detected by said location information detecting unit and the location information of the at least another relay device in the cluster of said relay device obtained by said location information obtaining unit; and
a second representative node switching unit configured to switch a role of the representative node from said relay device to a relay device located closest to the centroid location among said at least another relay device in the cluster of said relay device, the relay device located closest to the centroid location being specified by comparing the centroid location determined by said centroid location determining unit and the location information of the at least another relay device in the cluster of said relay device obtained by said location information obtaining unit.

8. A relay device comprising:
a channel determining unit configured to determine a channel used for intra-cluster communication in a cluster of said relay device to be a channel different from a channel used for intra-cluster communication in a neighboring cluster;
a notifying unit configured to notify at least another relay device in a cluster of said relay device about a predetermined channel, the cluster being formed of relay devices that share a common channel used for data communication;
a joining unit configured to allow a neighboring node among at least one neighboring node which exists in a neighborhood of the cluster of said relay device to join the cluster of said relay device by causing the neighboring node to use the predetermined channel for intra-cluster communication, the neighboring node being not associated with any cluster and capable of communicating with an every other relay device in the cluster of said relay device in a single hop, the intra-cluster communication being communication with the at least another relay device in a same cluster; and
a channel changing unit configured to change the channel used for the intra-cluster communication to the predetermined channel.

9. A relay device comprising:
a channel determining unit configured to determine a channel used for intra-cluster communication in a cluster of said relay device to be a channel different from a channel used for intra-cluster communication in a neighboring cluster, the cluster being formed of relay devices that share a common channel used for data communication, the intra-cluster communication being communication with at least another relay device in a same cluster;
a notifying unit configured to notify the at least another relay device in the cluster of said relay device about the channel determined by said channel determining unit;
a joining unit configured to allow a neighboring node among at least one neighboring node which exists in a neighborhood of the cluster of said relay device to join the cluster of said relay device by causing the neighboring node to use the channel determined by said channel determining unit for the intra-cluster communication, the neighboring node being not associated with any clusters and capable of communicating with an every other relay device in the cluster of said relay device in a single hop; and
a channel changing unit configured to change the channel used for the intra-cluster communication to the channel determined by said channel determining unit.

10. A data relay method comprising:
determining, when communication quality of the relay device does not meet predetermined quality and a representative node does not exist among at least one neighboring node, a channel used for intra-cluster communication in a cluster of the relay device to be a channel different from a channel used for intra-cluster communication in a neighboring cluster so that the relay device serves as the representative node, the cluster being formed of relay devices that share a common channel used for data communication, the intra-cluster communication being communication with at least another relay device in a same cluster, the at least one neighboring node being a neighboring relay device which can communicate with the relay device, the representative node being a representative relay device which determines a channel used for the intra-cluster communication;
notifying the at least another relay device that is associated with the cluster of the relay device about the channel determined in said determining;
allowing a neighboring node which is not associated with any cluster among the at least one neighboring node to join the cluster of the relay device by causing the neighboring node to use the channel determined by the representative node determining unit for the intra-cluster communication when the relay device is the representative node; and
changing the channel used for the intra-cluster communication to the channel determined in said determining.

11. A non-transitory computer-readable medium comprising a program causing a computer to execute:
determining, when communication quality of the relay device does not meet predetermined quality and a representative node does not exist among at least one neighboring node, a channel used for intra-cluster communication in a cluster of the relay device to be a channel different from a channel used for intra-cluster communication in a neighboring cluster so that the relay device serves as the representative node, the cluster being formed of relay devices that share a common channel used for data communication, the intra-cluster communication being communication with at least another relay device in a same cluster, the at least one neighboring node being a neighboring relay device which can communicate with the relay device, the representative node being a representative relay device which determines a channel used for the intra-cluster communication;

notifying the at least another relay device that is associated with the cluster of the relay device about the channel determined in said determining;

allowing a neighboring node which is not associated with any cluster among the at least one neighboring node to join the cluster of the relay device by causing the neighboring node to use the channel determined by the representative node determining unit for the intra-cluster communication when the relay device is the representative node; and changing the channel used for the intra-cluster communication to the channel determined in said determining.

12. The relay device according to claim 1, wherein the channel used for the intra-cluster communication in the cluster of said relay device is different from a channel used for inter-cluster communication that is communication with another relay device in a cluster different from the cluster of said relay device.

* * * * *